United States Patent
Ding et al.

(10) Patent No.: US 9,436,987 B2
(45) Date of Patent: Sep. 6, 2016

(54) GEODESIC DISTANCE BASED PRIMITIVE SEGMENTATION AND FITTING FOR 3D MODELING OF NON-RIGID OBJECTS FROM 2D IMAGES

(71) Applicant: Seiko Epson Corporation, Tokyo (JP)

(72) Inventors: Yuanyuan Ding, San Jose, CA (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 324 days.

(21) Appl. No.: 14/265,800

(22) Filed: Apr. 30, 2014

(65) Prior Publication Data

US 2015/0317821 A1 Nov. 5, 2015

(51) Int. Cl.
G06T 7/00 (2006.01)
G06T 7/60 (2006.01)
G06T 15/10 (2011.01)

(52) U.S. Cl.
CPC ............... *G06T 7/00* (2013.01); *G06T 7/0081* (2013.01); *G06T 7/60* (2013.01); *G06T 7/602* (2013.01); *G06T 15/10* (2013.01)

(58) Field of Classification Search
None
See application file for complete search history.

(56) References Cited

U.S. PATENT DOCUMENTS

| | | | |
|---|---|---|---|
| 7,974,443 B2 | 7/2011 | Kipman et al. | |
| 8,050,469 B2 | 11/2011 | Kaus et al. | |
| 2003/0020715 A1* | 1/2003 | Sakakura | B60R 16/0207 345/424 |
| 2007/0031064 A1* | 2/2007 | Zhao | G06T 7/0071 382/154 |
| 2010/0103170 A1 | 4/2010 | Baloch et al. | |
| 2011/0304619 A1 | 12/2011 | Fu et al. | |
| 2013/0096886 A1* | 4/2013 | Vorobyov | G01C 11/00 703/1 |
| 2013/0202197 A1* | 8/2013 | Reeler | G01S 17/89 382/154 |
| 2014/0105486 A1* | 4/2014 | Tamaazousti | G06T 7/0071 382/154 |
| 2014/0267614 A1* | 9/2014 | Ding | H04N 13/0275 348/46 |

OTHER PUBLICATIONS

Garcia, S., "Fitting Primitive Shapes to Point Clouds for Robotic Grasping", KTH Computer Science and Communication, Master of Science Thesis, Stockholm, Sweden 2009.
Bai, X., et al., "Active Skeleton for Non-rigid Object Detection", Computer Vision, 2009 IEEE 12th International Conference, Sep. 29, 2009-Oct. 2, 2009.
Torresani, L., et al., "Tracking and Modeling Non-Rigid Objects with Rank Constraints", Proceedings of the 2001 IEEE Computer Society Conference (vol. 1 ), Computer Vision and Pattern Recognition, 2001.

* cited by examiner

Primary Examiner — Michael J Cobb

(57) ABSTRACT

A stereo camera system produces a stereo image pair of a cable harness, which is used to define a 3D point cloud of the cable harness at its current pose position. Pose information of specific parts of the cable harness are determined from the 3D point cloud, and the cable harness is then re-presented as a collection of primitive geometric shapes of known dimensions, whose positions and orientations follow the spatial position and orientation of the imaged cable harness. The length, position and number of geometric shapes are atomically determined from a 2D image segmentation of one of the images in the stereo image pair.

20 Claims, 27 Drawing Sheets

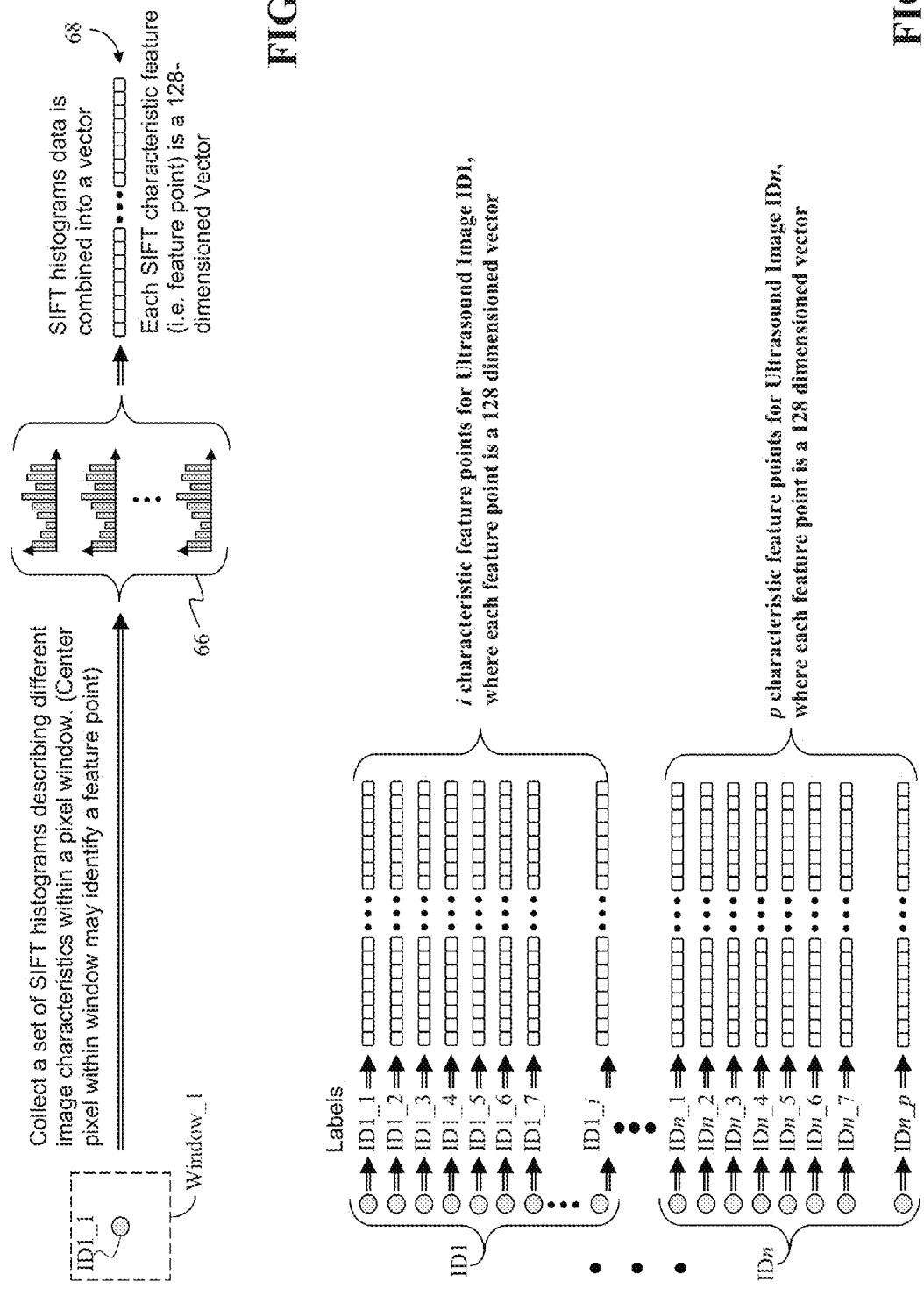

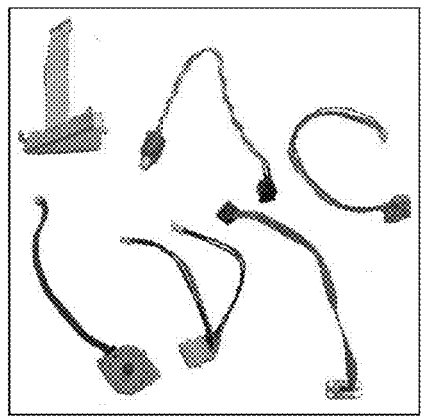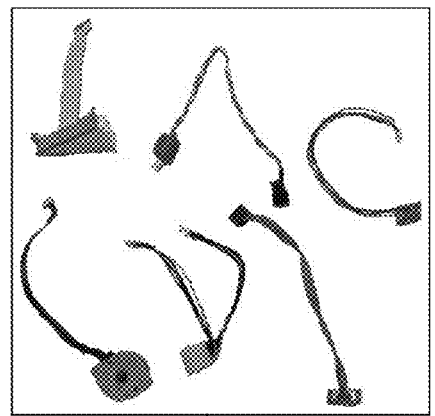
FIG. 14A
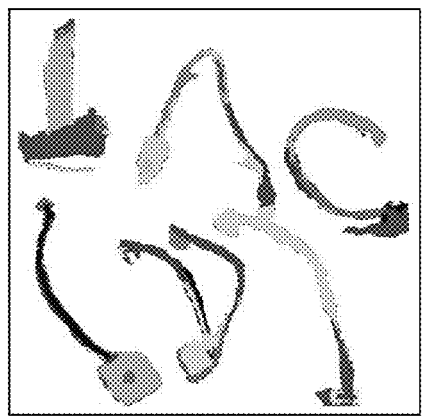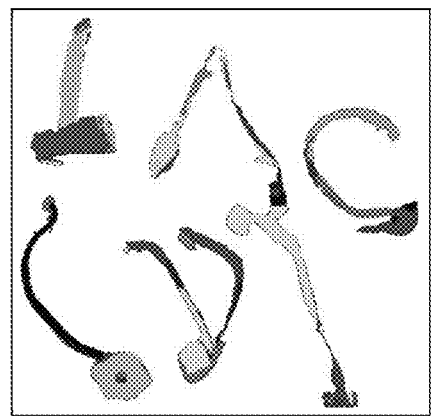
FIG. 14B
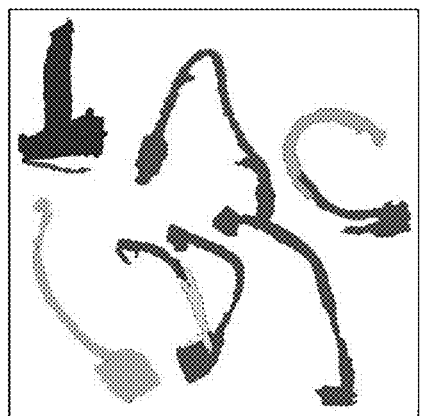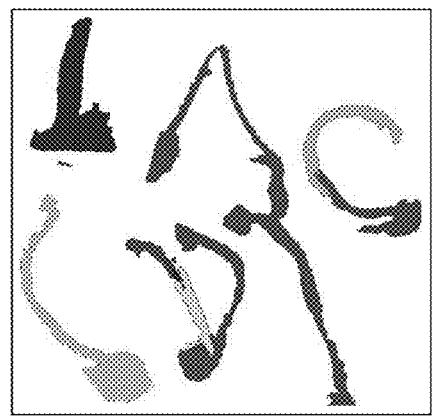
FIG. 14C

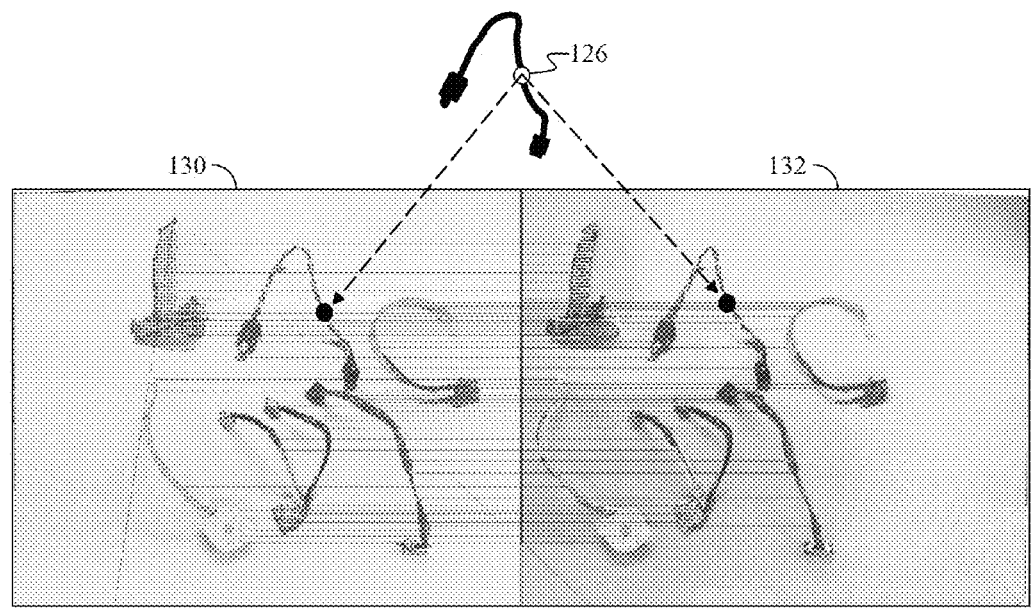

FIG. 16

$$\begin{pmatrix} uw \\ vw \\ w \end{pmatrix} = \begin{pmatrix} P_1 \\ P_2 \\ P_3 \end{pmatrix} \begin{pmatrix} x \\ y \\ z \\ 1 \end{pmatrix} \text{ and } \begin{pmatrix} u'w \\ v'w \\ w \end{pmatrix} = \begin{pmatrix} P_1' \\ P_2' \\ P_3' \end{pmatrix} \begin{pmatrix} x \\ y \\ z \\ 1 \end{pmatrix} \Longrightarrow \begin{pmatrix} uP_3 - P_1 \\ vP_2 - P_2 \\ u'P_3' - P_1' \\ vP_2' - P_2' \end{pmatrix} \begin{pmatrix} x \\ y \\ z \\ 1 \end{pmatrix} = 0$$

FIG. 17

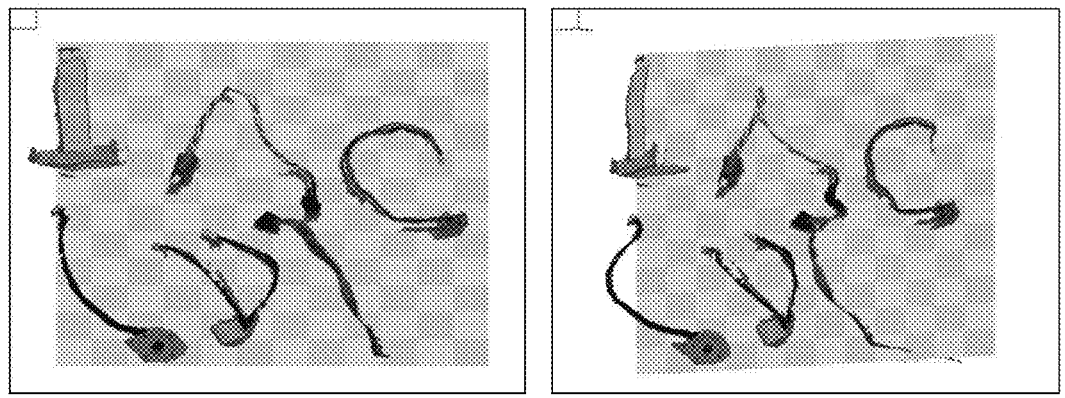

FIG. 18

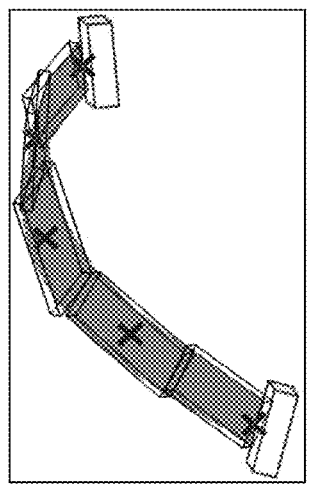
FIG. 20
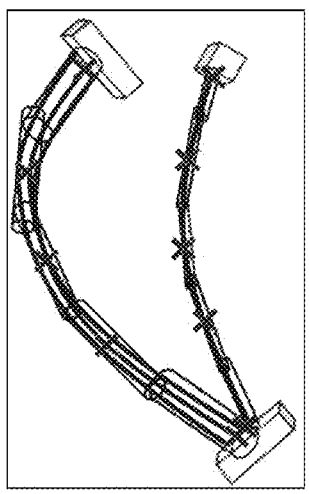
FIG. 19
FIG. 22

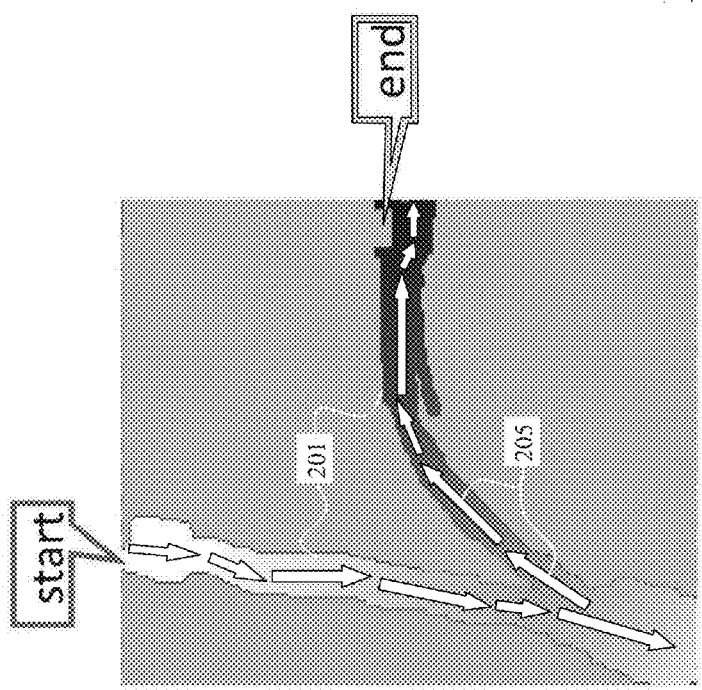
FIG. 26
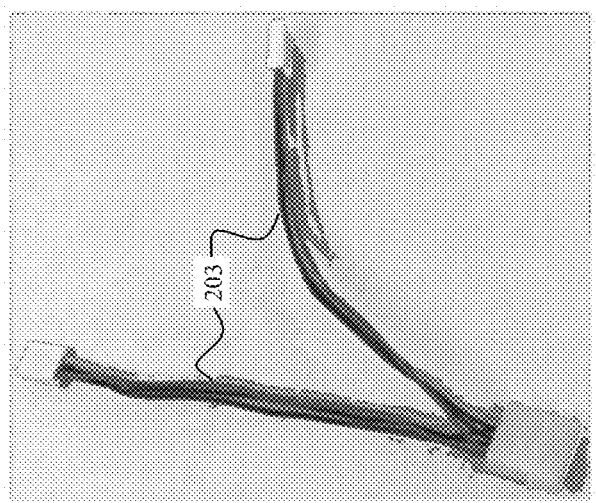
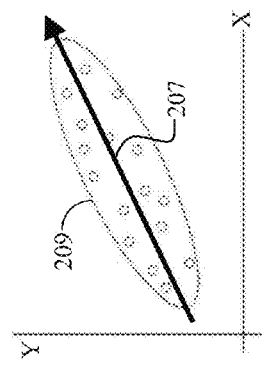
FIG. 27

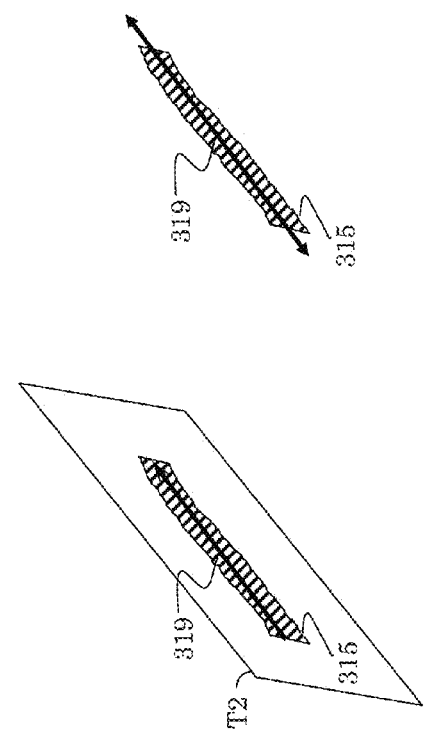
FIG. 40
FIG. 41
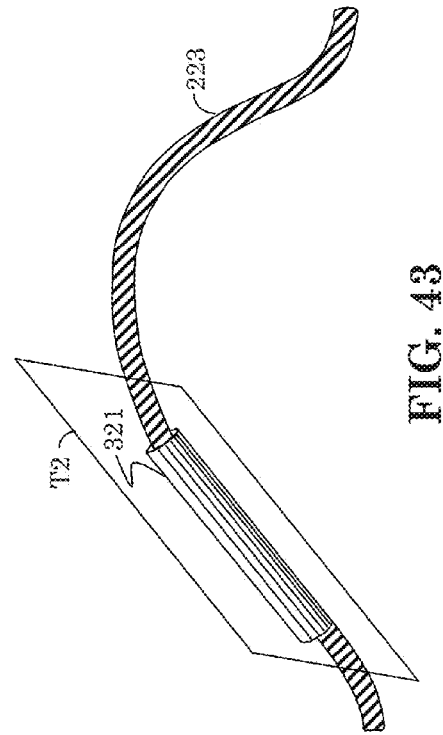
FIG. 43
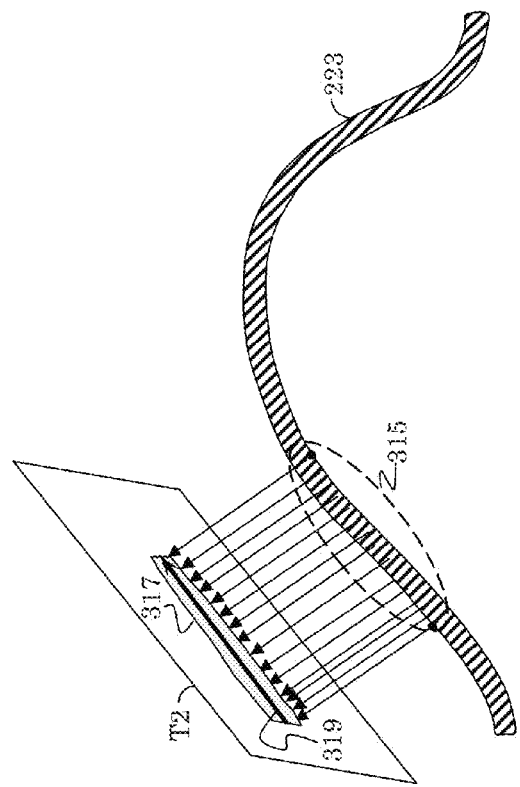
FIG. 39
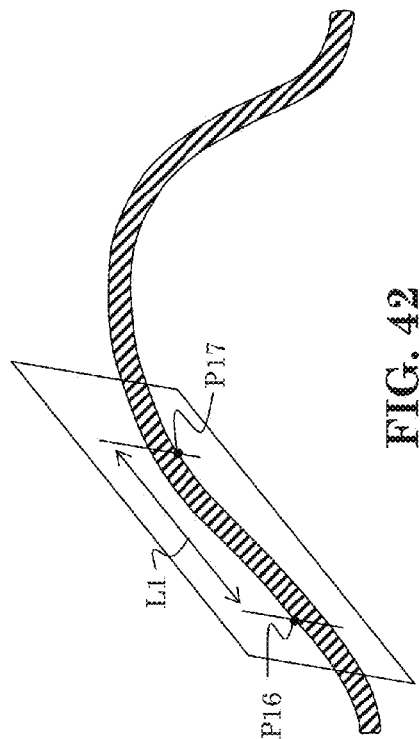
FIG. 42

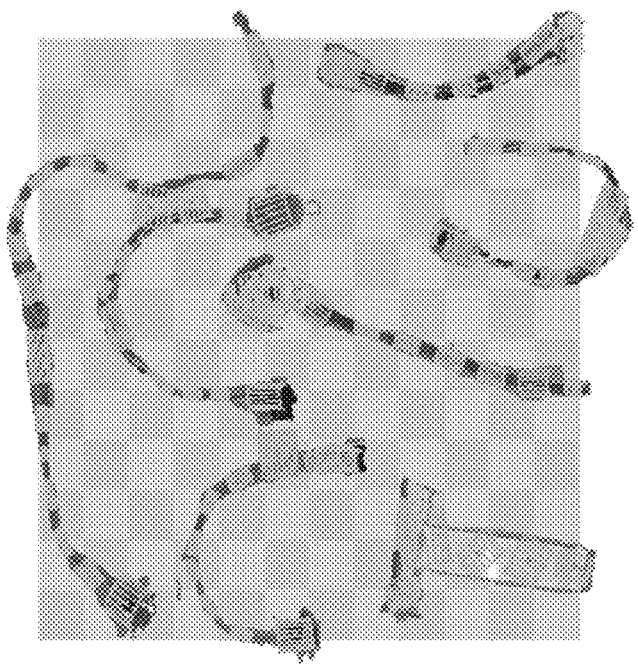
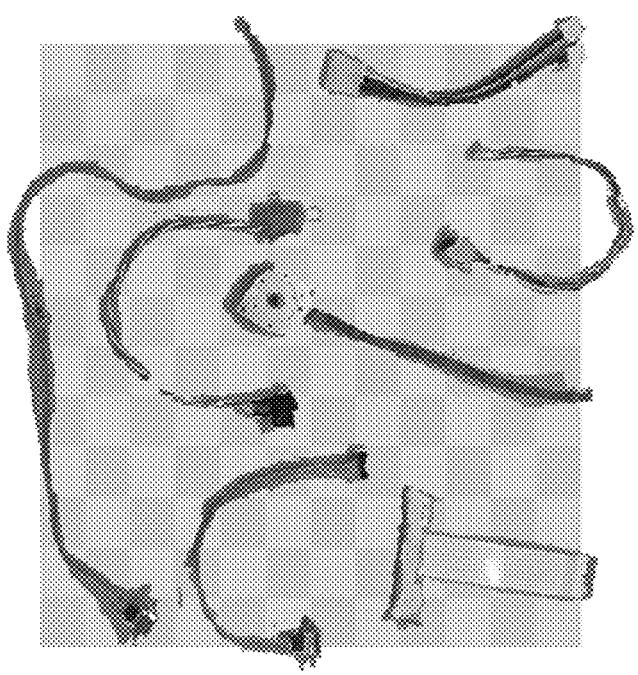
FIG. 44

GEODESIC DISTANCE BASED PRIMITIVE SEGMENTATION AND FITTING FOR 3D MODELING OF NON-RIGID OBJECTS FROM 2D IMAGES

BACKGROUND

1. Field of Invention

The present invention is generally directed to the field of robotic manipulation of objects. More specifically, it is directed towards machine recognition and manipulation of non-rigid objects, such as cable harnesses, by visual inspection of the non-rigid objects.

2. Description of Related Art

In the field of automated, or robotic, manufacturing or assembly, the ability to identify assembly components, manipulate and attach them to other components is very important. Often, this is achieved by use of assembly stations, where each assembly station is limited to one component having one known orientation and requiring simplified manipulation.

It would be advantageous, however, for a machine to be able to visually select a needed component from a supply of multiple components, identify any key assembly features of the component, and manipulate the selected component as needed for assembly. This would require that the machine have some capacity for computer vision, object recognition and manipulation.

Before discussing some details of computer vision, it may be beneficial to first discuss how computer vision has previously been used in the field of robotic (or machine) vision. Two important aspects of robotic vision are the identifying of an object and the estimating of its pose, i.e. its 3-dimensional (i.e. 3D) orientation relative to a known reference point and/or plane.

Since most cameras take 2-dimensional (i.e. 2D) images, many approaches attempt to identify objects in a 2D image and infer some 3D information from the 2D image. For example, in "Class-specific grasping of 3D objects from a single 2D image", by Chiu et al. *The 2010 IEEE/RSJ International Conference on Intelligent Robots and Systems*, Oct. 18-22, 2010, Chiu et al. describe superimposing 2D panels in the form of simplified 2D shapes on the surface of objects in a 2D image. The 2D panels on each imaged object form a set that defines the object in the 2D image. The generated 2D panels can then be compared with a library of panel sets that define different types of predefined 3D objects, such as a car. Each library panel set is compared from different view directions with the generated 2D panels of the imaged object in an effort to find a relatively close match. If a match is found, then in addition to having identified the object, one has the added benefit of having a good guess as to its orientation given the matched orientation of the 2D panel set of the predefined 3D object in the library.

A second example is found in "Human Tracking using 3D Surface Colour Distributions" by Roberts et al. *Image and Vision Computing,* 2006, by Roberts et al. In this example, Roberts et al describe a system where simplified 2D shapes are superimposed on known rigid parts of a human body (such as the head, torso, arms, etc) in a 2D video image. The movements of the superimposed, simplified 2D shapes follow the movements of the moving human in the 2D video. By analyzing the movements of the 2D shapes, it is possible to discern the movement of the imaged human.

As is stated above, however, identifying a desired object in an image is only part of the solution, particularly when dealing with moving objects. In such cases, one further needs to discern information about the viewed object's pose, or orientation, in three-dimensional (i.e. 3D) space and its possible movement through 3D space. Various approaches have been used to address this need.

For example, in "3D Pose Estimation for Planes", by Xu et al. *Computer Vision Workshops (ICCV Workshops)*, 2009 IEEE 12*th International Conference* on Sep. 27, 2009-Oct. 4, 2009. Xu et al. describe using a plane outline on the surface of a target object in a non-stereo image, and estimating the plane's normal direction to estimate the object's pose orientation.

A second example is found in "Robust 3D Pose Estimation and Efficient 2D Region-Based Segmentation from a 3D Shape Prior", by Dambreville et al. *European Conference on Computer Vision ICCV,* 2008. Dambreville et al. describe segmenting a rigid, known, target object in a 2D image, and estimating its 3D pose by fitting onto the segmented target object, the best 2D projection of known 3D poses of the known target object.

A third example is provided in "Spatio-temporal 3D Pose Estimation of Objects in Stereo Images" by Barrois et al. *Proceedings of the 6th international conference on Computer vision systems*, ICVS'08. Barrois et al. describe using a 3D object's normal velocity (defined by the object's main direction of movement) at one point in time to estimate its pose at another point in time along a movement path.

Returning to the subject of computer vision, it is generally desirable that an image not only be captured, but that a computer is able to identify and label various features within the captured image. Basically, a goal of computer vision is for the computer to duplicate the abilities of human vision by electronically perceiving and understanding the contents of a captured image. This involves extracting symbolic information from image data using models constructed with the aid of geometry, physics, statistics, and learning theory. Thus, the field of computer vision includes methods for acquiring, processing, analyzing, and gleaning an understanding of imaged objects, in order to form decisions.

Various approaches for identifying features within a captured image are known in the industry. Many early approaches centered on the concept of identifying shapes of rigid bodies. For example, if a goal was to identify a specific rigid item, such as a wrench or a type of wrench, then a library of the different types of acceptable wrenches (i.e. examples of "true" wrenches) would be created. The outline shapes of the true wrenches would be stored, and a search for the acceptable outline shapes would be conducted on a captured image.

Outline shapes within a captured image might be identified by means of a segmentation process, which is a process by which the outlines (or masks) of foreground objects within a digital image are defined by differentiating the image's foreground pixels from the image's background pixels. This would define an outline of the foreground object, such as a wrench, and the defined outline could then be compared with a library of known wrench outlines in various pose positions. This approach of searching the outline of a shape was successful when one had an exhaustive library of acceptable outline shapes, the library of known outline shapes was not overly large, the outline shape of the target object within the digital image did not deviate much from the predefined true outline shapes, and the background surrounding the target object was not overly complicated.

For complex searches, however, this approach is not effective. The limitations of this approach become readily apparent when the subject (i.e. object) being sought within an image is not static (i.e. non-rigid), but is prone to change and/or deformation. For example, a human face has definite characteristics, and its distortion is limited, but it still does not have an easily definable number of shapes and/or appearance it may adopt. It is to be understood that the term appearance is herein used to refer to color and/or light differences across an object, as well as other surface/texture variances. Other types of target objects may be prone to far more deformation than a human face. For example, cable harnesses have definite characteristics, but may take many different shapes and arrangements due to their wiring lacking many, if any, rigid structures.

Although an exhaustive library of samples of a known rigid body may be compiled for identification purposes, it is self-evident that compiling an exhaustive library of non-rigid or amorphous objects and their many variations due to pose angle, color, and lighting differences is a practical impossibility. Thus, statistical methods have been developed to address these difficulties.

Developments in image recognition of objects that change their shape and appearance, are discussed in "Statistical Models of Appearance for Computer Vision", by T. F. Cootes and C. J. Taylor (hereinafter Cootes et al.), Imaging Science and Biomedical Engineering, University of Manchester, Manchester M13 9PT, U.K. available at Hypertext Transfer Protocol address "www.isbe.man.ac.uk," Mar. 8, 2004, which is hereby incorporated in its entirety by reference.

To better mimic human vision, it is advantageous for machines to incorporate stereo vision, and thereby obtain depth information from captured images. Images of a common scene taken from different view angles are the basis for stereo vision and depth perception. In this case, corresponding feature points in two images taken from different view angles (and/or different fields of vision) of the same subject (or scene) can be combined to create a perspective view of the scene. Thus, imaging a scene from two different view points (i.e. from two different field-of-views, FOVs) creates stereo vision, which provides depth information about objects in the scene.

This ability would be particularly helpful in the field of robotics and automated assembly/construction. In these applications, a machine having stereo vision and the ability to discern (i.e. identify) target items would ideally have the ability to independently retrieve the target item and use it in an assembly.

Implementing such vision capabilities, however, is still a challenge, even in a specialized assembly line where the number of possible target object variants is limited. The challenges become even more daunting when the target objects are amorphous, or non-rigid, and prone to change in shape and/or appearance, such as in the case of wire harnesses.

It is an object of the present invention to provide a system for identifying and manipulating cable harnesses for use in robotic assembly lines.

It is a further object of the present invention to make use of 3D information for determining pose information of cable harnesses.

It is object of the present invention to provide an automated 3D visual system to facilitate machine manipulation of cable harnesses.

SUMMARY OF INVENTION

The above objects are met in a cable harness visualization system using stereo imaging to view cable harnesses, determine their pose, automatically identify specific segments (and/or parts) of the viewed cable harness, and represent the specific segments as a chain of simple geometric shapes for ease of manipulation.

The preferred method assumes the availability of a 3D (i.e. three dimensional) point cloud representation of the cable harness (or other modular objects with multiple degrees of freedom) at a given pose position/orientation, and a 2D (i.e. two dimensional) image segmentation. In order to facilitate the identification of pixels in the 2D image segmentation that correspond to points in the point cloud, it is preferred that the 2D image segmentation be created from one image of a stereo image pair of images taken of the cable harness at the same pose as represented in the 3D point cloud.

Preferably, a 2D cable localization module may be used to identify pairs of commonly imaged cables in a pair of stereo images (i.e. stereo image pair), and a 3D cable localization module then creates a 3D point cloud of the identified pairs of commonly imaged cables. Alternatively, a 3D imaging system may create a 3D model of an image harness separate from the stereo image pair. The 3D imaging system may include, for example, a 3D laser scanner, a KINECT sensor (such as produced by MICROSOFT Corp.), and/or a time-of-flight device or similar device, such as a range camera. Irrespective of how the 3D point cloud is constructed, normal directions may be determined for individual points within the 3D point cloud to determine the cable harness's pose.

A preferred embodiment of the present invention may be embodied by a method of generating a 3D geometric primitive representation of a physical target object, where method includes using a data processing device to implement the following steps: accessing a 3D point cloud representation of the target object at a given pose position; accessing a 2D (i.e. two dimensional) image segmentation of the target object, wherein the 2D image segmentation is generated from a 2D image of the target object at the given pose position; identifying a first end-point and a second end-point of the 2D image segmentation, the first end-point being at an opposite end of the 2D image segmentation as the second end-point; correlating the first and second end-points to corresponding first and second 3D points of the 3D point cloud representation; determining the principle direction along the 2D image segmentation from the first end-point to the second end-point; identifying a working region on the 2D image segmentation, the working region encompassing the first end-point and having a first pair of opposing boundaries traversing the 2D image segmentation across its principle direction, the working region being sized to enclose all parts of the 2D image segmentation that lie between its opposing boundaries and being smaller than the total area of 2D image segmentation; and starting with the current working region and continuing toward the second-end point along the determined principle direction of the 2D image segmentation, implementing the following steps: (i) defining the portion of the 2D image segmentation enclosed by the working region as a 2D image sub-segment; (ii) defining as a cable-segment direction, a linear direction identifying the prominent direction of the edge pixels within the 2D image sub-segment; (iii) within the 2D image sub-segment, identifying as first and second key points the pixels having the largest distance perpendicular to the cable-segment direction and still bound by the 2D image sub-segment; (iv) identifying as first and second principle 3D points, the two 3D points within the 3D point cloud that correspond to the first and second key points on the 2D image subsegment; (v) identifying a working 3D sub-cloud comprised of 3D points from the subset of the 3D point cloud that corresponds to the 2D image sub-segment; (vi) fitting a tangent plane to the working 3D sub-cloud; (vii) projecting the 3D points of the working 3D sub-cloud to the tangent plane in the normal direction of the tangent plane; (viii) defining an axis line parallel to the principle direction of the projected 3D points on the tangent plane; (xi) projecting the 3D points within the working 3D sub-cloud to the axis line; (x) using the first and second principle 3D points to define a length for a most-current 3D geometric primitive shape oriented along the axis line and encompassing at least a portion of the working 3D sub-cloud; (xi) using the projected 3D points within the working 3D sub-cloud to the axis line to define at least one of a width, height and radius of the most-current 3D geometric primitive shape; and (xii) IF the second end-point is not within the part of the 2D image segmentation that corresponds to the 3D points encompassed by the most-current 3D geometric primitive shape, THEN selectively defining a new region on said 2D image segmentation along its principle direction toward the second end-point and excluding the part of the 2D image segmentation that corresponds to the 3D points encompassed by the most-current 3D geometric primitive shape, said new region having a first pair of opposing boundaries traversing the 2D image segmentation across its principle direction, said new region being sized to enclose all parts of the 2D image segmentation that lie between its opposing boundaries, and redefining said new region as a working region and proceeding to step (i); ELSE defining the chain of previously created 3D geometric primitive shapes as the generated 3D geometric primitive representation of the physical target object.

Preferably, the 3D point cloud is created from a pair of stereo images of the target object at the given pose position, and the 2D image is one of the pair of stereo images.

Irrespective, the first and second end-points may be respectively identified as the two pixels on the 2D image segmentation having the longest geodesic distance between them.

The first and second 3D points of the 3D point cloud representation may be at edge regions of the 3D point cloud representation. Preferably, the first 3D point is at an opposite end of the 3D point cloud as the second 3D point.

Further preferably, the working region is a geometric shape. More specifically, the working region may a parallelogram, such as a square. The parallelogram may be angled parallel to the cable-segment direction of step (ii), and the prominent direction may be determined from the gradient of the edge pixels in the 2D image sub-segmentation.

Additionally in step (v), the working 3D sub-cloud may comprise all the 3D points from the subset of the 3D point cloud that corresponds to the 2D image sub-segment.

It is to be understood that the step (viii) preferably includes determining the principle direction of projected 3D points on the tangent plane. Additionally in step (viii), the axis line may traverse the working 3D sub-cloud. In this case, axis line may be concentric to the working 3D sub-cloud. Alternatively in step (viii), the principle direction of the projected 3D points on the tangent plane may define the axis line. In this case, the axis line is on the plane.

It is further preferred that in step (ix), the 3D points within the working 3D sub-cloud are projected perpendicularly to the axis line.

Step (x) may also include defining first and second boundary lines perpendicular to the axis line and respectively traversing the first and second principle 3D points, wherein the distance between the first and second boundary lines defines the length of most-current 3D geometric primitive shape.

In step (xi), if the most current 3D geometric primitive is a cylinder, then the radius of the cylinder may be determined to be not smaller than the longest projection distance among the projected 3D points.

Also in step (xi), if the most current 3D geometric primitive is a cuboid (such as a cube or a rectangular cuboid) with its length determined from the first and second principle 3D points, then its height and width may be defined to not extend beyond necessary to fully encompass all the projected 3D points, as determined from their projection ranges.

In step (xii), it is preferred that the a new region be selected to be defined if the part of the 2D image segmentation that corresponds to the 3D points encompassed by the most-current 3D geometric primitive shape is not within a predefined geodesic distance from second end-point.

It is further preferred that the new region of step (xii) be of the same shape and size as the most previous working region, such that all the created regions of the same size and shape, but each region may be angled differently according to the prominent direction of the edge pixels of the 2D image segmentation it encompasses.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIG. 10 provides an overview of the feature point extraction function of SIFT.

FIG. 11 illustrates multiple sets of feature points extracted from n images, where the images are identified as ID1 through IDn.

FIGS. 14A, 14B and 14C illustrate various steps to achieving image segmentation.

FIG. 16 provides an example of the operation of stereo matching block 109.

FIG. 17 is an example of a triangulation operation.

FIG. 18 illustrates reconstructed 3D cable geometry in 3D space shown from two different views.

FIG. 19 illustrates the labeling of cable centers on rounded cables.

FIG. 20 illustrates the labeling of cable centers in a flat ribbon cable.

FIG. 22 illustrates a chain of 3D geometric primitives (i.e. cylinders) constructed using the approach of FIG. 21 (two views).

FIG. 26 provides an example of a 2D image segmentation mask 201 that outlines (e.g. identifies or classifies as foreground) a cable 203 image from background components of a 2D image.

FIG. 27 illustrates the concept of principle direction.

FIG. 39 illustrates the projecting of select 3D points of onto a local tangent plane.

FIG. 40 illustrates the defining of a primary direction of the projected points on the tangent plain of FIG. 39.

FIG. 41 illustrates the projecting of the select 3D points of FIG. 39 onto the primary direction of FIG. 40.

FIG. 42 illustrates the use of two key points to determine a length for a primitive, 3D geometric shape to be constructed.

FIG. 43 illustrates a cylinder defined by the length determined in FIG. 42 and the range of 3D projections of FIG. 41.

FIG. 44 provide an example of a 2D/3D location determined from a stereo image pair, and the resultant primitive 3D geometric shapes constructed using an automated method in accord with the present invention.

DESCRIPTION OF THE PREFERRED EMBODIMENTS

Figure 1:
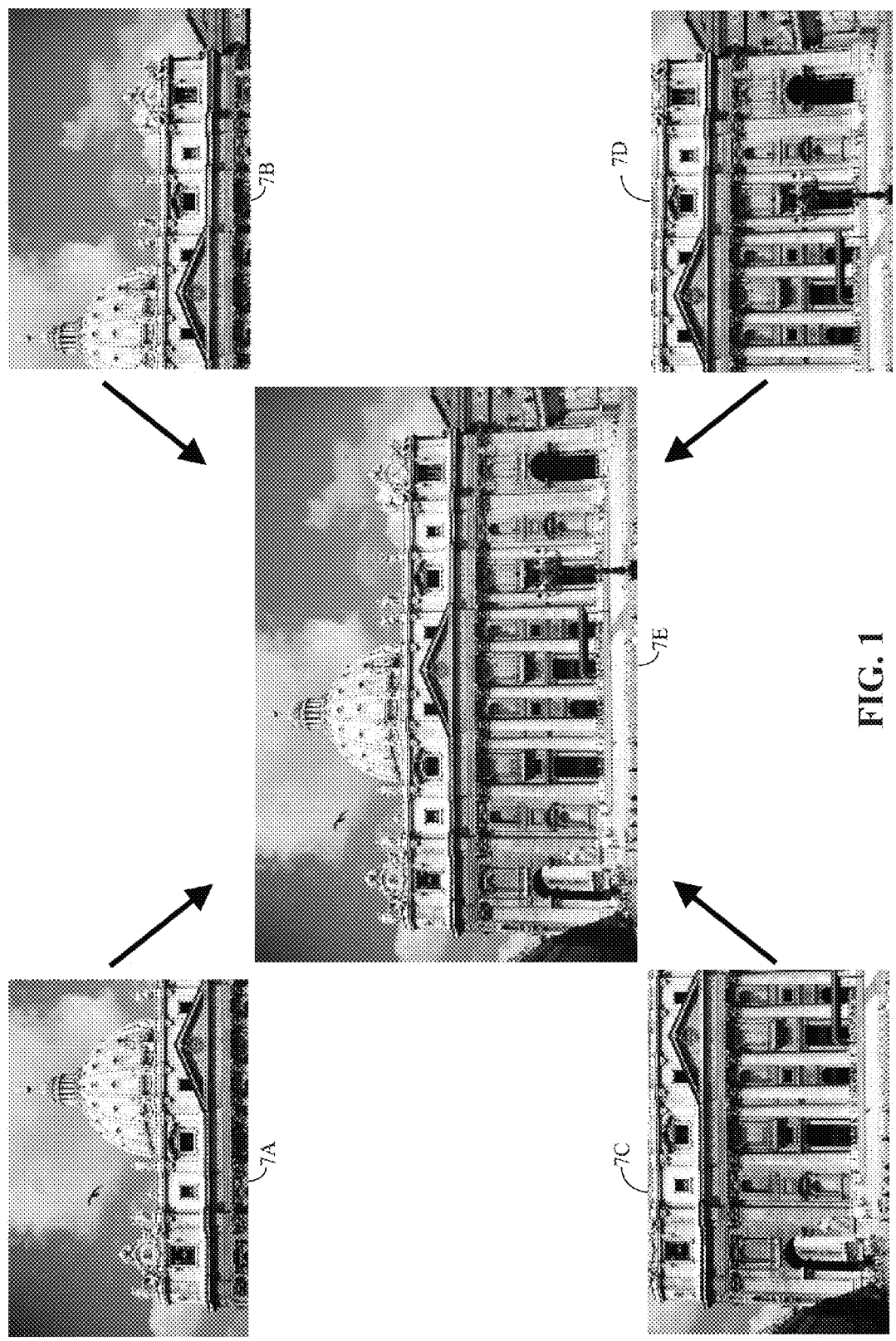
FIG. 1 illustrates the use of corresponding feature points in different images to stitch together the images to create a larger composite image.

Automated assembly of components is critical to the manufacture of many items. Often, automated assembly is limited to relatively rigid components, or sub-components to facilitate their manipulation. There is a need, however, for robotic assemblies to be able to manipulate non-rigid bodies. In particular, it would be beneficial for an automated system to be able to manipulate cable harness, which have a non-rigid structure and are prone to take many different configurations. It is further beneficial for such an automated system to be able to distinguish between different cable harnesses in a collection, and to be further able to identify specific parts of the cable harness, such as differencing connectors (e.g. cable couplers) from wires and wire sleeves. There is a further need for such an assembly to be able to discern the pose, i.e. orientation and/or arrangement, of cable harnesses in order to identify specific connectors on the cable harnesses, and to properly align connectors to their corresponding receptacles.

It is presently preferred that such an automated system be able to receive 3-dimensional (3D), i.e. perspective, images, which provide depth information about a scene, such as an assembly line, and extract pose information about an imaged cable harness from the 3D image.

The 3D images of target objects may be produced by means of a 3D imaging system, such as a 3D laser scanner, a MICROSOFT CORP. KINECT sensor, a range camera, or any of many different types of time-of-flight devices. A 3D image may also be generated from a stereo pair of 2D images.

The presently preferred embodiment makes use of a point cloud, which is a collection of points in three-dimensional space that define the surface of a 3D object. In a preferred embodiment, it is further desirable that the points of the 3D point cloud be correlated to individual points (e.g. pixels) on a 2D image (or shape outline) of a target object. That is, it is desirable that points (or regions) of the point cloud be correlated to corresponding points (or regions) of a 2D image, and more particularly to a segmentation of the 2D image, as is explained more fully below.

As is mentioned above, a 3D image may be generated from a stereo pair of 2D images (i.e. a stereoscopic (or stereo) image pair). Each of the two 2D images in a stereoscopic image pair is produced by a respective one of two 2D imaging cameras spaced apart to provide two views (i.e. two fields-of-view, FOV, or angle views) of a common scene. By means of stereo constraints, point (or pixel) information of corresponding pixels in the two views is combined to create a perspective (i.e. 3D) view, which includes point cloud information. Thus, a point cloud generated from a stereoscopic image pair intrinsically includes a correlation between points of the point cloud and points (e.g. pixels or regions) in the two 2D images of the stereoscopic image pair. Consequently, for ease of implementation a preferred embodiment of the present invention makes use of a point cloud generated from a stereo pair of 2D images. For the sake of completeness, therefore, a brief discussion of a stereo image pair (i.e. a stereoscopic image pair) is herein provided.

In order to extract 3D information from a stereoscopic image pair, one first needs to be able to identify commonly imaged items in the stereoscopic image pair. A common way to do this is to calibrate the two cameras, and to identify a know point of reference in a specific scene. A less restrictive approach would eliminate the need to calibrate the cameras to a specific scene. However, since both images of the stereoscopic image pair provide different views of the common scene, this can be a difficult task. One needs to recognize different views of common objects in two 2D image scenes, and to correlate specific parts of the common objects.

Object recognition (or object identification) is thus an integral part of computer vision, and an integral part of object recognition is pattern matching. An essential component of pattern matching in images (and particularly in 2D images) is feature detection, which refers to identifying parts of an image, or individual feature points of an image (such as individual pixels), that are good candidates for investigation to determine if they might be part of a sought after object in an image.

Various techniques are known for identifying characteristic features in an image that may be used to describe an imaged scene. Characteristic features may include distinguishing shapes or sections-of-an-image or individual points (i.e. pixels) of an image. For ease of discussion, the present exemplary embodiment is described as using feature points (which include individual pixels); with the understanding that other characteristic features (and methods of identifying characteristic features) may also be used without deviating from the present invention.

As an example of how characteristic features may be used, if one has a library of identifying features that describe an object (such as obtained from a collection of training images (i.e. image samples) of the target object, or object type), then one may search an input test image for those identifying features in an effort to determine if an example of the target object is present in the input test image. In the field of computer vision, this idea has been extended to matching common features of a common scene in multiple digital images of the common scene taken from different view angles (i.e. different FOVs) to index (e.g. match or correlate) feature points (i.e. pixels) from one image to another. This permits the combined processing of the multiple digital images.

For example in FIG. 1, images 7A, 7B, 7C and 7D each provide partial, and overlapping, views of a building in a real-world scene, but none provide a full view of the entire building. However, by applying edge detection and indexing (i.e. identifying matching pairs of) feature points in the four partial images 7A, 7B, 7C and 7D that correlate to the same real feature point in the real-world scene, it is possible to stitch together the four partial images (such as by applying an image stitching tool) to create one composite image 7E of the entire building. In the example of FIG. 1, the four partial images 7A, 7B, 7C and 7D are taken from the same view angle (i.e. a single FOV), but this approach may be extended to the field of correspondence matching and applied to images taken from different FOV's.

Correspondence matching refers to the matching of objects or object features (or more typically the matching of feature points, such as individual pixels) common to two or more images. Correspondence matching tries to determine which parts of a first image correspond to (i.e. are matched to) what parts of a second image, assuming that the second image was taken after the camera that took the first image had moved, time had elapsed, and/or the pictured objects had moved. For example, the first image may be of a real-world scene taken from a first view angle, defining a first field-of-view (i.e. FOV), and the second image may be of the same real-world scene taken from a second view angle defining a second FOV. Assuming that the first and second FOVs at least partially overlap, correspondence matching refers to the matching of common features points in the overlapped portions of the first and second images.

Thus, correspondence matching is an essential problem in computer vision, especially in stereo vision, view synthesis, and 3D (or perspective) reconstruction. Assuming that a number of image features, or objects, in two images taken from two view angles have been matched, epipolar geometry may then be used to identify the positional relationship between the matched image features to achieve stereo view synthesis, or 3D reconstruction.

Epipolar geometry is basically the geometry of stereo vision. For example in FIG. 2, two cameras 11 and 13 create two 2D images 15 and 17, respectively, of a common 3D scene 10 consisting of a larger sphere 19 and a smaller sphere 21. 2D images 15 and 17 are taken from two distinct view angles 23 and 25. Epipolar geometry describes the geometric relations between points in 3D scene 10 (for example spheres 19 and 21) and their relative projections in 2D images 15 and 17. These geometric relationships lead to constraints between the image points, which are the basis for epipolar constraints, or stereo constraints, described more fully below.

Figure 2:
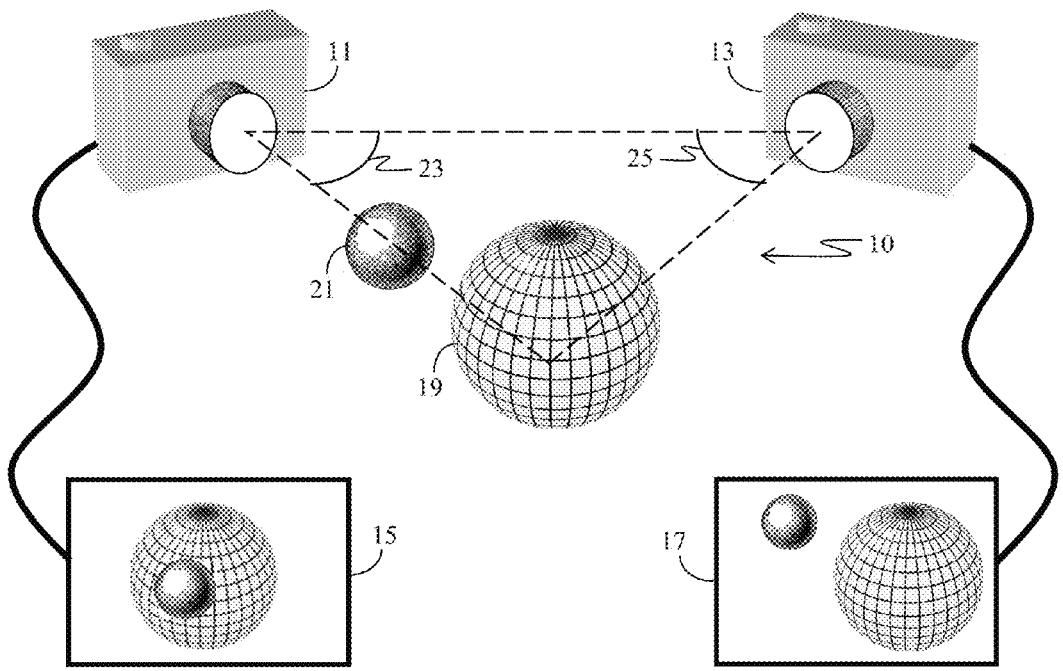
FIG. 2 illustrates the principles of Epipolar geometry.

FIG. 2 illustrates a horizontal parallax where, from the view point of camera 11, smaller sphere 21 appears to be in front of larger sphere 19 (as shown in 2D image 15), but from the view point of camera 13, smaller sphere 21 appears to be some distance to a side of larger sphere 19 (as shown in 2D image 17). Nonetheless, since both 2D images 15 and 17 are of the same 3D scene 10, both are truthful representations of the relative positions of larger sphere 19 and smaller sphere 21. The positional relationships between camera 11, camera 13, smaller sphere 21 and larger sphere 19 thus establish geometric constraints on 2D images 15 and 17 that permit one to reconstruct 3D scene 10 given only 2D images 15 and 17, as long as the epipolar constraints (i.e. stereo constraints) are known.

Figure 3:
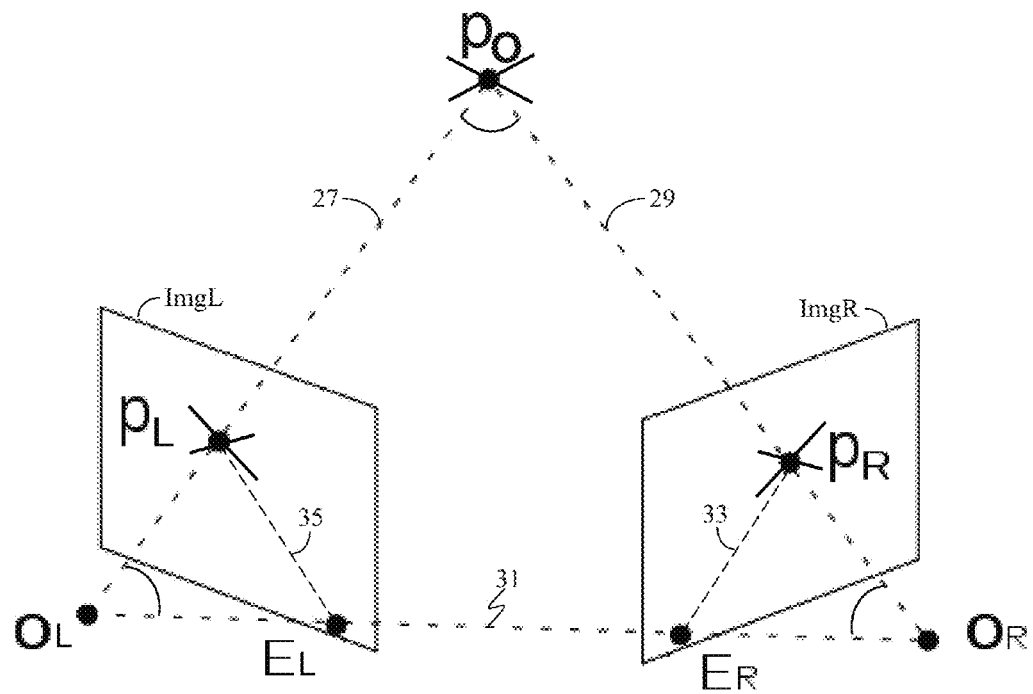
FIG. 3 is an example of defining stereo constraints using Epipolar geometry.

Epipolar geometry is based on the well-know pinhole camera model, a simplified representation of which is shown in FIG. 3. In the pinhole camera model, cameras are represented by a point, such as left point $O_L$ and right point $O_R$, at each respective camera's focal point. Point $P_O$ represents the point of interest (i.e. an object) in the 3D scene being imaged, which in the present example is represented by two crisscrossed lines.

Typically, the image plane (i.e. the plane on which a 2D representation of the imaged 3D scene is captured) is behind a camera's focal point and is inverted. For ease of explanation, and to avoid the complications of a an inverted captured image, two virtual image planes, ImgL and ImgR, are shown in front of their respective focal points, $O_L$ and $O_R$, to illustrate non-inverted representations of captured images. One may think of these virtual image planes as windows through which the 3D scene is being viewed. Point $P_L$ is the 2D projection of point $P_O$ onto left virtual image ImgL, and point $P_R$ is the 2D projection of point $P_O$ onto right virtual image ImgR. This conversion from 3D to 2D may be termed a perspective projection, or image projection, and is described by the pinhole camera model, as it is known in the art. It is common to model this projection operation by rays that emanate from a camera and pass through its focal point. Each modeled emanating ray would correspond to a single point in the captured image. In the present example, these emanating rays are indicated by dotted lines 27 and 29.

Epipolar geometry also defines the constraints relating the positions of each camera relative to each other. This may be done by means of the relative positions of focal points $O_L$ and $O_R$. The focal point of a first camera would project onto a distinct point on the image plane of a second camera, and vise-versa. In the present example, focal point $O_R$ projects onto image point $E_L$ on virtual image plane ImgL, and focal point $O_L$ projects onto image point $E_R$ on virtual image plane ImgR. Image points $E_L$ and $E_R$ are termed epipoles, or epipole points. The epipoles and the focal points they project from lie on a single line, i.e. line 31.

Line 27, from focal $O_L$ to point $P_O$, is seen as a single point $P_L$ in virtual image plane ImgL, because point $P_O$ is directly in front of focal point $O_L$. This is similar to how in image 15 of FIG. 2; smaller sphere 21 appears to be in front of larger sphere 19. However, from focal point $O_R$, the same line 27 from $O_L$ to point $P_O$ is seen a displacement line 33 from image point $E_R$ to point $P_R$. This is similar to how in image 17 of FIG. 2; smaller sphere 21 appears to be displaced to a side of larger sphere 19. This displacement line 33 may be termed an epipolar line. Conversely from focal point $O_R$, line 29 is seen as a single point $P_R$ in virtual image plane ImgR, but from focal point $O_L$, line 29 is seen as displacement line, or epipolar line, 35 on virtual image plane ImgL.

Epipolar geometry thus forms the basis for triangulation. For example, assuming that the relative translation and rotation of cameras $O_R$ and $O_L$ are known, if projection point $P_L$ on left virtual image plane ImgL is known, then the epipolar line 33 on the right virtual image plane ImgR is known by epipolar geometry. Furthermore, point $P_O$ must projects onto the right virtual image plane ImgR at a point $P_R$ that lies on this specific epipolar line, 33. Essentially, for each point observed in one image plane, the same point must be observed in another image plane on a known epipolar line. This provides an epipolar constraint that corresponding image points on different image planes must satisfy.

Another epipolar constraint may be defined as follows. If projection points $P_L$ and $P_R$ are known, their corresponding projection lines 27 and 29 are also known. Furthermore, if projection points $P_L$ and $P_R$ correspond to the same 3D point $P_O$, then their projection lines 27 and 29 must intersect precisely at 3D point $P_O$. This means that the three dimensional position of 3D point $P_O$ can be calculated from the 2D coordinates of the two projection points $P_L$ and $P_R$. This process is called triangulation.

Figure 4:
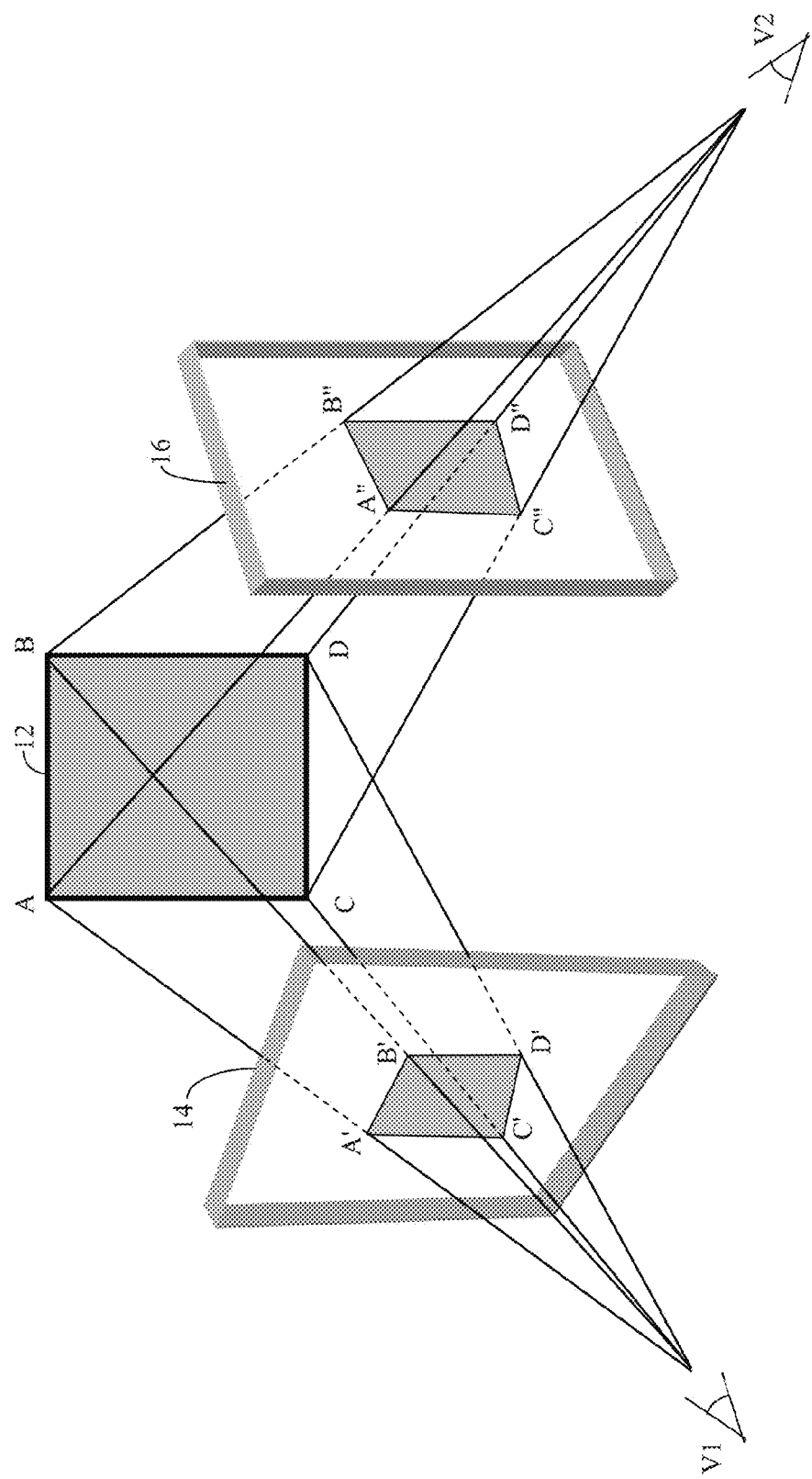
FIG. 4 illustrates the establishment of homography constraints from stereo constraints.

Epipolar geometry also forms the basis for homography, i.e. projective transformation. Homography describes what happens to the perceived positions of observed objects when the point of view of the observer changes. An example of this is illustrated in FIG. 4, where the shape of a square 12 is shown distorted in two image projections 14 and 16 as viewed from two different points of view V1 and V2, respectively. Like before, image planes 14 and 16 may be thought of as windows through which the square 12 is viewed.

Homography would identify the points in common between image projections 14 and 16 and square 12 (i.e. point registration). For example, the four corners A, B, C and D of square 12 correspond respectively to points A', B', C' and D' in image projection 14, and correspond respectively to points A", B", C" and D" in image projection 16. Thus, points A', B', C' and D' in image projection 14 correspond respectively to points A", B", C" and D" in image projection 16.

Assuming that the pinhole model applies, epipolar geometry permits homography to relate any two images of the same planar surface in space, which permits image rectification, image registration, or computation of camera motion (rotation and translation) between two images. Once camera rotation and translation have been extracted from an estimated homography matrix, this information may be used for navigation, or to insert models of 3D objects into an image or video, so that they are rendered with the correct perspective and appear to have been part of the original scene.

Figure 5:
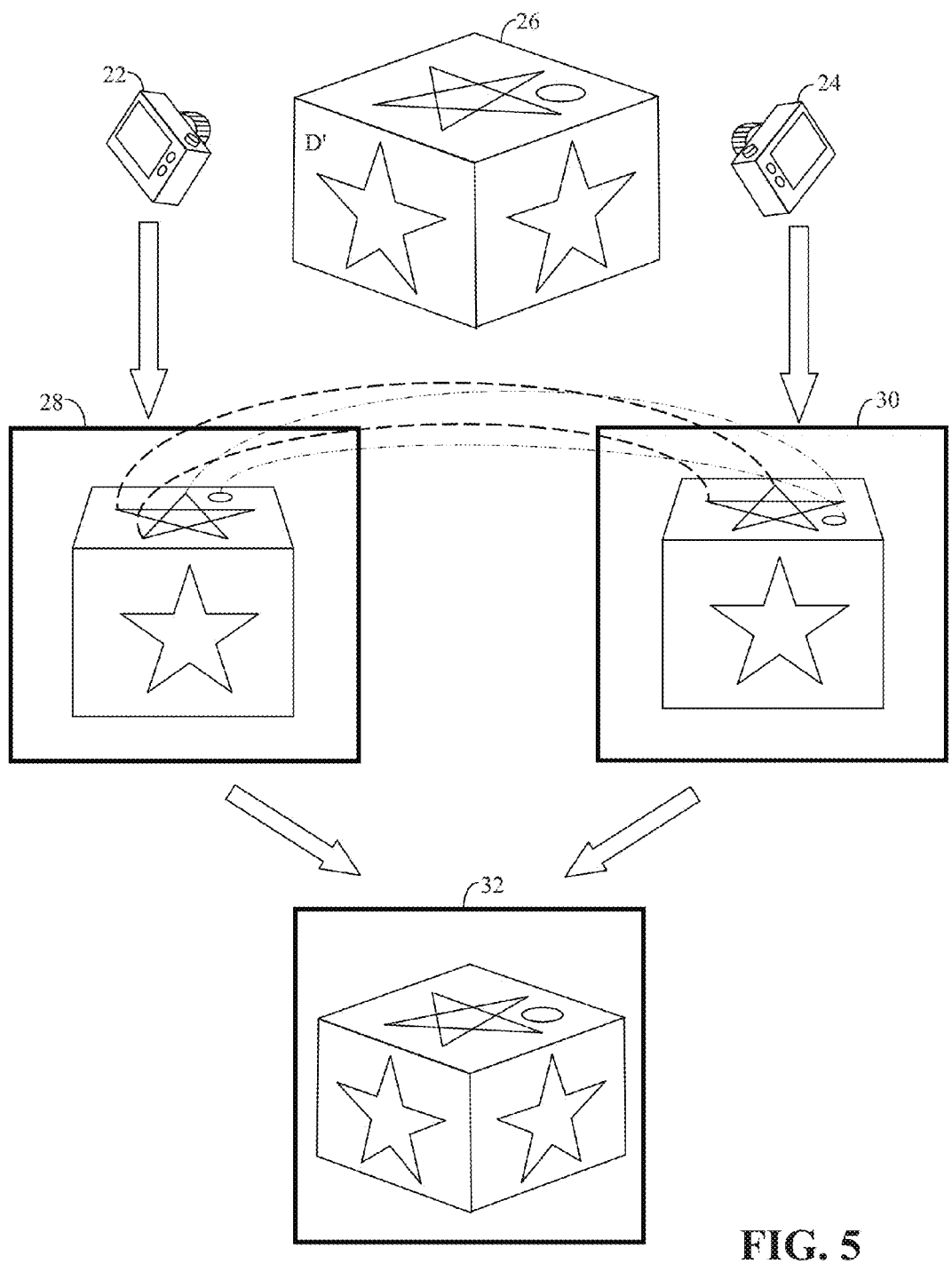
FIG. 5 illustrates homography to re-establish a perspective (i.e. 3D) view from a stereo pair of image, which are images of a common scene but each image has a different field-of-view, i.e. FOV.

For example in FIG. 5, cameras 22 and 24 each take a picture of a 3D scene of a cube 26 from different points of view. From the view point of camera 22, cube 26 looks as shown in 2D image 28, and from the view point of camera 24, cube 26 looks as shown in 2D image 30. Homography permits one to identify correlating points, some of which are shown by dotted lines for illustration purposes. This permits both 2D images 28 and 30 to be stitched together to create a 3D image, as shown in image 32. Thus, automatically finding correspondence between pairs of images is the classic problem of stereo vision. Integral to this, however, is the identifying of feature points in the pairs of images, and the matching of corresponding feature points in the pairs of images.

The above discussion of stereo vision, such as epipolar geometry and homography, may be collectively referred to as perspective constraints, particularly as applied to a stereo image pair.

Because of their use in establishing perspective (i.e. 3D) information, feature based correspondence matching algorithms have found wide application in computer vision. Examples of feature based correspondence matching algorithms are the scale-invariant feature transform, SIFT, and the Affine SIFT (or ASIFT). It is noted, however, that feature based correspondence matching algorithms, such as SIFT and Affine SIFT, purposely exclude edge points from their analysis and thus are not well suited for edge detection.

As it is known in the art, the SIFT algorithm scans an image and identifies points of interest, or feature points, which may be individual pixels and describes them sufficiently (typically relative to its neighboring pixels within a surrounding window) so that the same feature point (or pixel) may be individually identified in another image. A discussion of the SIFT transform is provided in U.S. Pat. No. 6,711,293 to Lowe, which is herein incorporated in its entirety by reference. Essentially, SIFT uses a library of training images to identify feature points that are characteristic of a specific object. Once a library of the object's characteristic feature points (e.g. pixels) have been identified, the feature points can be used to determine if an instance of the object is found in a newly received test image. Other examples of feature point extraction are provided in "ORB: an efficient alternative to SIFT or SURF" by Rublee et al. *International Conference on Computer Vision*, 2011, wherein ORB stands for Oriented FAST and Rotated BRIEF.

Principally, feature points (i.e. points of interest) of the object are extracted to provide a "feature description" of a specific object. This description, extracted from training images, can then be used to identify the specific object in a test image containing many object-types. To perform reliable recognition, it is preferred that the features extracted from the training images be detectable under changes in image scale, noise, illumination, and rotation. Feature points usually lie near high-contrast regions of an image. However, since distortion of an object (such as if a feature points is located in an articulated or flexible parts of the object) may alter a feature point's description relative to its neighboring pixels, changes to an object's internal geometry may introduce errors. To compensate for these errors, SIFT typically detects and uses a large number of feature points so that the effects of errors contributed by these local variations may be reduced.

In a typical SIFT application, feature points of objects are first extracted from a set of training images and stored in a database. An object is recognized in a new image (i.e. a test image) by individually comparing each feature point extracted from the new image with the feature points in this database and finding candidate matching features based on Euclidean distance of their feature point vectors. From the full set of matches, subsets of feature points that agree on the object and its location, scale, and orientation in the new image are identified to filter out good matches. Consistent clusters of good matches are then identified. Typically, each cluster of three or more features that agree on an object and its pose is then subject to further detailed model verification and subsequently outliers are discarded. Finally the probability that a particular set of features indicates the presence of a specific object is computed, given the accuracy of fit and number of probable false matches. Object matches that pass all these tests can be identified as correct.

Figure 6:
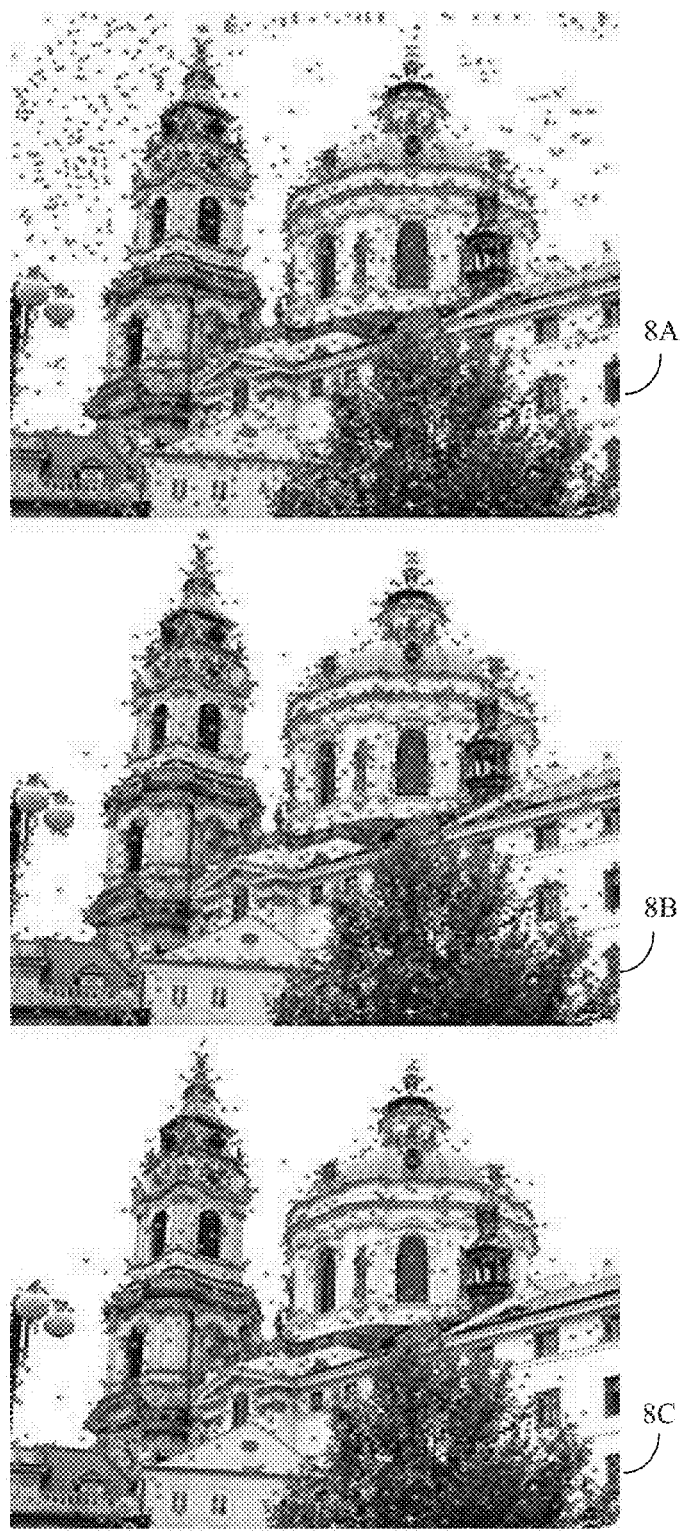
FIG. 6 illustrates feature point extraction from a sample image.

An example of a SIFT determination of feature points in an image is illustrated in FIG. 6. Possible feature points are first identified, as indicated by dark dots in image 8A. Possible feature points that have a low contrast are then discarded, as illustrate in image 8B. Finally, possible features points located on edges are removed, which leaves the final set of feature points shown in image 8C.

Figure 7:
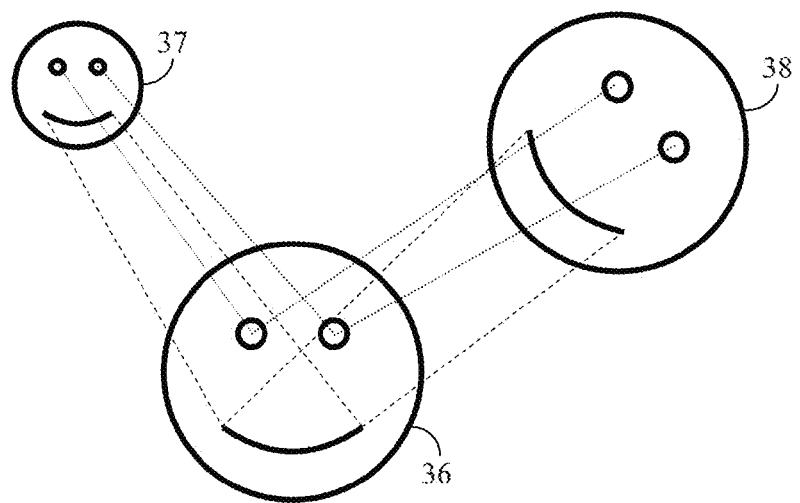
FIG. 7 illustrates the establishment of feature point correspondence using an SIFT transform.

Thus, SIFT permits one to match feature points of an identified object from one image to another. This is illustrated in FIG. 7, where three images of the same object, i.e. a happy face, are shown. For illustration purposes, only four feature points, corresponding to points near the eyes and the corners of the mouth, are shown. As indicated in FIG. 7, SIFT can match feature points from a first face 36 to a second face 37 irrespective of a change in scale. SIFT can also match feature points from first face 36 to a third face 38 irrespective of rotation. However, SIFT has been found to have limited immunity to affine transforms of images. That is, SIFT is limited to the amount of change in the view-angle an imaged object can undergo and still be identified.

A method of extending a SIFT transform to better handle affine transformations is described in "ASIFT: A New Framework for Fully Affine Invariant Image Comparison" by Morel et al, SIAM Journal on Imaging Sciences, vol. 2, issue 2, 2009, which is herein incorporated in its entirety by reference.

Figure 8:
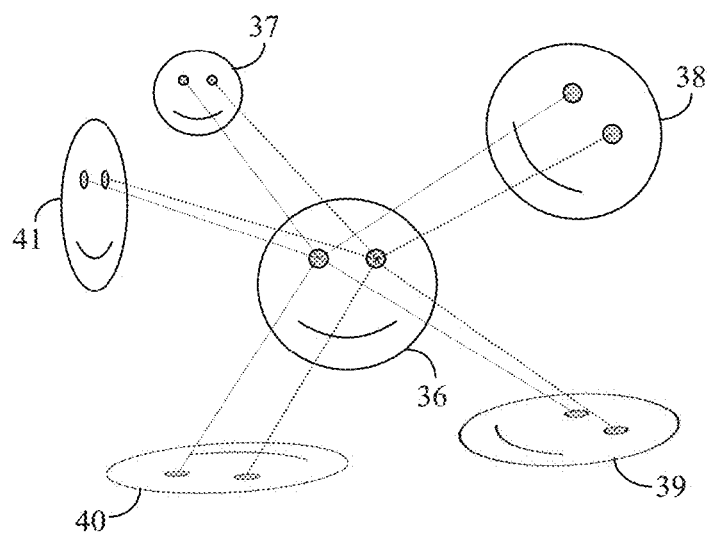
FIG. 8 illustrates the establishment of feature point correspondence using an ASIFT transform.

With reference to FIG. 8, an Affine SIFT would be better able to match feature points from first face 36, to representations of the same object that have undergone affine transformations, as illustrated by happy faces 39, 40, and 41.

Figure 9:
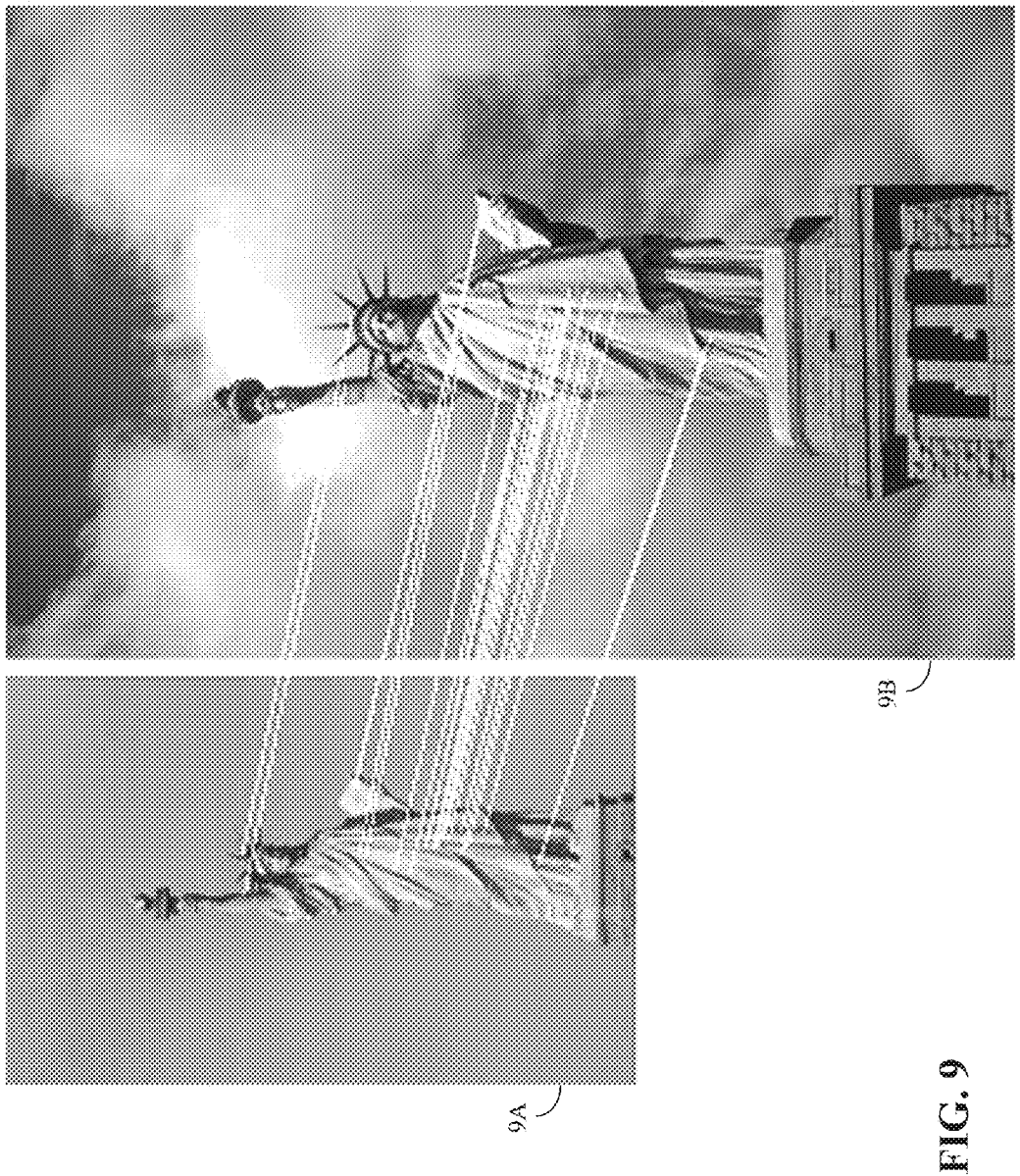
FIG. 9 is an example of feature point correspondence in two images of a common scene, taken from different field-of-views, i.e. FOVs.

An example of an application of an Affine SIFT transform is illustrated in FIG. 9, where multiple feature points are matched from a first image 9A of the Stature of Liberty from a first view angle, to a second image 9B of the Statue of Liberty from a different view angle and at a different scale.

A quick overview of the feature point extraction function of a SIFT filter/algorithm/module/processor is illustrated in FIGS. 10 and 11. With reference to FIG. 10, each extracted feature point ID_1 (such as those illustrated in FIG. 5-8) is described by a series of metrics falling into several categories, i.e. distinguishing characteristics, within a window, e.g. an array of pixels represented as Window 1. The center point (or center pixel) within a window may be identified as the feature point for that window. If desired, each feature point is assigned an identification code, ID, for quick reference. For example feature point ID1_1 may identify the feature point as being feature point number "1" extracted from image "ID1".

The observed metrics are arranged into corresponding histograms, and thus multiple histograms are created for each feature window. Consequently, a typical SIFT processing algorithm creates a series, or a set, of SIFT histograms 66, and each set of histograms collectively describes an individual feature point (or SIFT descriptor). Each of the SIFT histograms statistically describes a distinguishing characteristic of the feature point relative to its neighborhood of pixels (or pixel window) surrounding the feature point (or item descriptor) in the image being processed.

The series of SIFT histograms 66 are then collected (or otherwise combined) into single vector 68, which defines one feature point. That is, each vector 68 provides sufficient data to identifying an individual pixel (or feature point) within an image. Therefore, each vector 68 describes a single item descriptor (i.e. a feature point or characteristic feature or (feature) pixel) and typically consists of 128 pieces of descriptive data. Thus, each feature point is characterized (i.e., described or identified) by a 128-dimensioned vector 68.

FIG. 11 illustrates multiple sets of feature points extracted from n images, where the images are identified as ID1 through IDn. Each image is shown to have a set of feature points (illustrated as circles) individually identified. For example, i feature points are extracted from image ID1, and they are labeled ID1_1 through ID1_i. Similarly, p feature points are extracted from image IDn, and they are labeled IDn_1 through IDn_p. Each feature point is a 128-dimension vector (i.e. a vector with 128 data cells). The extracted feature points from one image may then be matched to (i.e. compared to find a match with) extracted feature points from other images.

3D sensing is crucial for robotic arms to effectively grasp and manipulate cables on worktable, and may be implemented using 3D depth sensors such as a range scanner, time-of-flight device, 3D laser scanner, KINECT sensor from MICROSOFT CORP.® and/or a range camera.

Figure 12:
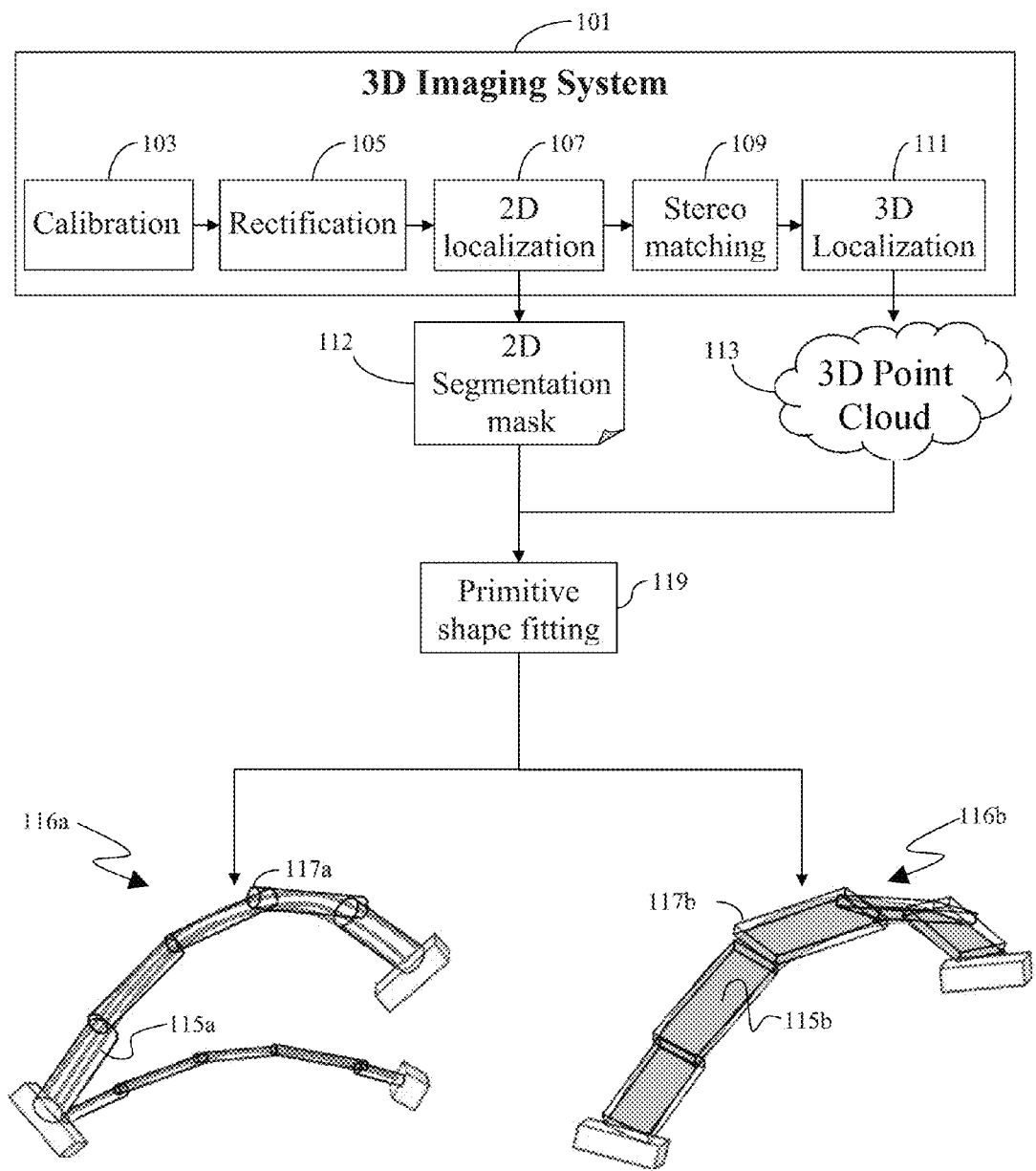
FIG. 12 illustrates a preferred embodiment using a 3D imaging system based on a stereo image pair to generate a 3D model (including a 3D point cloud) to generate primitive-shape fitted models of non-rigid items.

As shown in FIG. 12, however, the presently preferred embodiment uses a 3D imaging system 101 based on a stereo image pair to generate a 3D model (which includes a 3D point cloud 113, hereinafter referred to interchangeably as 3D cloud 113) of one or more imaged cable harnesses (or other imaged subject, preferably having a non-rigid body, or a partially non-rigid body). That is, 3D imaging system 101 functions as a 3D sensing component to provide the present embodiment with 3D cloud 113.

Thus, the preferred embodiment uses a stereo vision system for 2D localization and 3D reconstruction of cable harnesses. Further preferably, the system uses a stereo-rig of two webcams (i.e. a stereo pair of cameras) that are synchronized to capture images of cable harnesses (i.e. harness cables). It is to be understood that the use of webcams is a design choice, and other more powerful, or specialized, cameras may be used.

The system first calibrates the stereo pair of cameras, as indicated by calibration block 103, and rectifies camera images produced by the stereo pair of cameras, as indicated by rectification block 105.

2D localization block 107 then segments the images to identify 2D locations of individual pieces of the cable harness(es). These segments may be defined by means of a connected component (CC) operation and/or segmentation and/or other suitable operation known in the art. The 2D localization block 107 further preferably recognizes that the identified segments may only be pieces (or parts) of a whole cable (i.e. cable harness), and selectively groups the pieces of each cable to form a composite whole cable harness. This may be achieved by grouping the identified pieces based on consistency of appearance and geometrical properties to create a complete (2D) image segmentation of each cable harness. For example, pieces that are close to each other and have a similar appearance (i.e. color and/or shade and/or intensity) may be grouped together. Similarly, two pieces that appear to extend from one another based on a consistent geometry of some features, such as the angle of their sides, may be grouped together even if they do not lie close to each other. In such cases, 2D localization block 107 may add any missing segment portion between separated segments in order to join them together. Each completed (2D) image segmentation (or 2D segmentation mask) thus identifies the 2D location, and outline, of each cable harness within each of the stereo image pair. As will be explained more fully below, the primitive shape fitting block 119 of the present invention makes use of at least one 2D segmentation mask 112 to determine the geodesic distance between end-points of the cable harnesses (or other non-rigid body) and to control the construction of a chain of 3D geometric shapes.

Stereo matching of the cable harnesses, or cables, is then implemented by stereo matching block 109. That is, corresponding cables in each of the two stereo image pairs and their commonly imaged features are identified. This may be implemented by applying feature point detection algorithm, such as ASIFT, to the individually identified cables (or cable masks or segmentations). Optionally, the (2D) image segmentation may be used as a mask to narrow the search for corresponding cables and their commonly imaged features. Alternatively, feature points may be identified from the full images. If desired, the feature point pairs determined from the full images may then be filtered using the cables masks identified by means of the image segmentation (which may include connected components) as described above. Tree-based stereo matching, or other feature point matching technique known in the art, may be used to calculate the correspondence between the feature points of the left and right images produced by the stereo pair of cameras.

In 3D localization block 111, the corresponding left-image pixels and right-image pixels of a stereo image pair are then triangulated to determine the 3D point position of the associated cable point(s), such as is explained above. Each determined 3D point position constitutes on point in a 3D point cloud. In this manner, 3D localization block 111 produces 3D point cloud 113. If 3D imaging system 101 is implemented by some alternate technique that has not yet produced a 3D point cloud (i.e. if a 3D point cloud has not yet been defined by the preceding blocks), then a point cloud may be produced at this time, as indicated by 3D point cloud 113.

The 3D point cloud 113 and 2D image segmentation information from block 107 are then submitted to primitive shape fitting block 119, which fits primitive geometric shapes onto the 3D point cloud in accordance with geodesic distance values determined from the 2D image segmentations. For example, as illustrated by cable 116*a*, if the cable is comprised of individual rounded wires 115*a*, then the preferred primitive shape is a series of cylinders 117*a* that encompass the wires 115*a* and follow the flow of wires 115*a*. Alternatively as illustrated by wire harness 116*b*, if the wire harness 116*b* consists of a flat ribbon cable 115*b*, then the preferred primate shape is a series of rectangular parallelograms (or cuboids) 117*b* that follow encompass ribbon cable 115*b* and follow the flow of ribbon cable 115*b*. That is, primitive shape fitting block 119 fits the reconstructed 3D points 113 of each cable into a continuous chain of 3D primitive shapes, such as cylinders 117*a* and/or rectangular prisms (e.g. cuboids) 117*b*, that follow the 3D pose (e.g. orientation) of the cable harness as determined from 3D point cloud 113. If desired, these estimated cable primitives can be fitted to a structure representation model and a robotic system can control a robotic arm and hand to manipulate the cables using the representation model.

An exemplary implementation is herein described. For illustration purposes, the following system may use a pair of robot arms, each having a hand. Two webcams may be used preferably having an image Resolution of 2592×1944 pixels, a camera distance (Baseline) of 20 cm, a camera convergence angle of 30 degrees, a tilt angle of 10 degrees with respect to a worktable, a distance to the worktable of 60 cm, and a visible area on the worktable of 55 cm×55 cm.

Calibration of the stereo pair of cameras, as illustrate by calibration block 103, may be implemented using standard camera calibration methods. For example, a standard checkerboard-based calibration algorithm may be used. In this case, the camera is calibrated by placing a checkerboard at different positions and orientations, and capturing a pair(s) of image(s). All the camera parameters including focal length and 3D pose can then be calibrated using these images. An example of camera calibration using a checkerboard is illustrated in "A flexible new technique for camera calibration", *IEEE Transactions on Pattern Analysis and Machine Intelligence*, Vol. 22, No. 11, pages 1330-1334, 2000, by Z. Zhang, which is herein incorporated in its entirety by reference.

Preferably, rectification block 105 implements homography-based image rectification using the calibrated camera parameters. An example of the operation of Rectification block 105 is illustrated in FIGS. 13A, 13B and 13C.

Figure 13A:
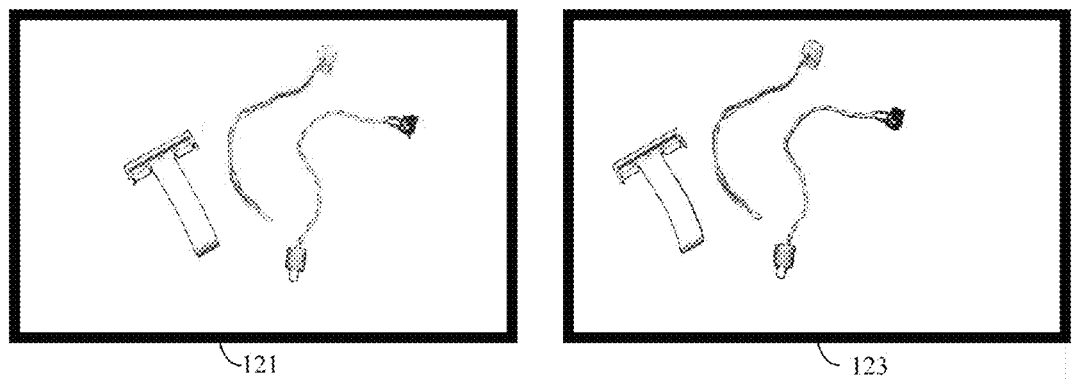
FIG. 13A shows initial, non-calibrated left and right images as produced by a stereo camera pair.

FIG. 13A shows an initial, non-calibrated left image 121 as produced by a first of the stereo camera pair, and an initial, non-calibrated right image 123 as produced by the second of the stereo camera pair. Rectification refers to the aligning and orienting of the images so that their common subjects are aligned to each other as much as possible.

Figure 13B:
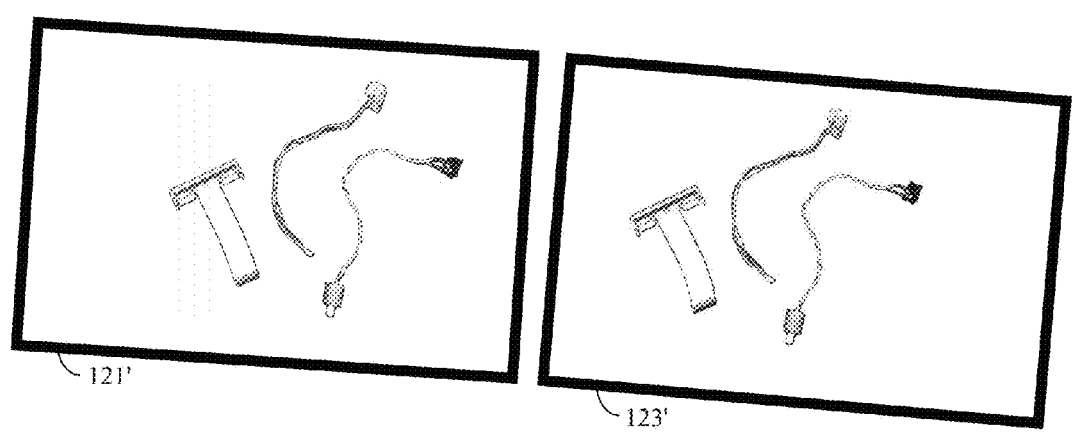
FIG. 13B shows the left and right images of FIG. 13A, after partial rectification.

FIG. 13B shows the left and right images, respectively labeled 121' and 123', after partial rectification. Partially rectified left and right images 121' and 123' have a common orientation, but are not yet aligned.

Figure 13C:
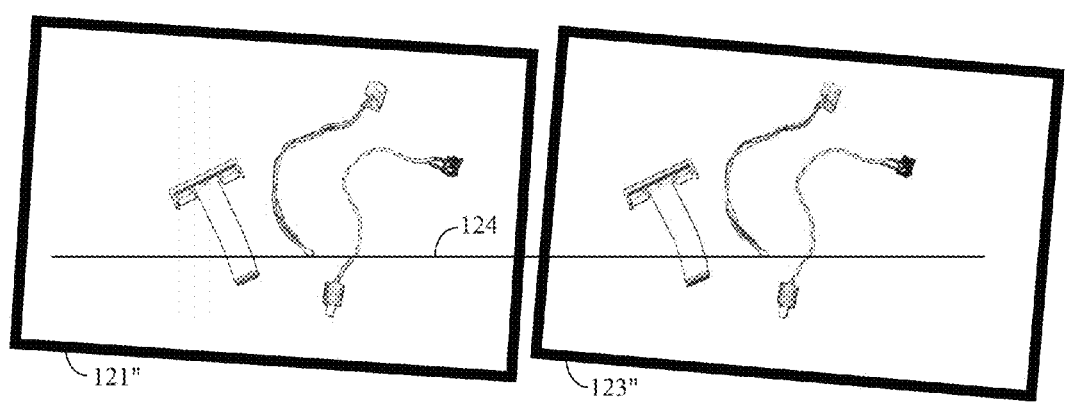
FIG. 13C illustrates that rectification provides for corresponding points in the rectified left and right images to be located on the same horizontal line.

After rectification, as illustrate in FIG. 13C, corresponding points (i.e. pixels) in the rectified left image 121" and rectified right image 123" are located on the same horizontal line, as illustrated by horizontal line 124. As is shown in FIG. 12, rectification block 105 passes the left and right rectified images, 121" and 123", to 2D localization block 107, which produces image segmentation.

An example of image segmentation is illustrated in FIGS. 14A, 14B and 14C. Images 125a and 127a are examples of rectified left and right images, respectively, such as produced by rectification block 105. For ease of discussion, FIG. 15 shows an expanded view of 3D Imaging System block 101 of FIG. 12, where all elements similar to those of FIG. 12 have similar reference characters and are described above.

Figure 15:
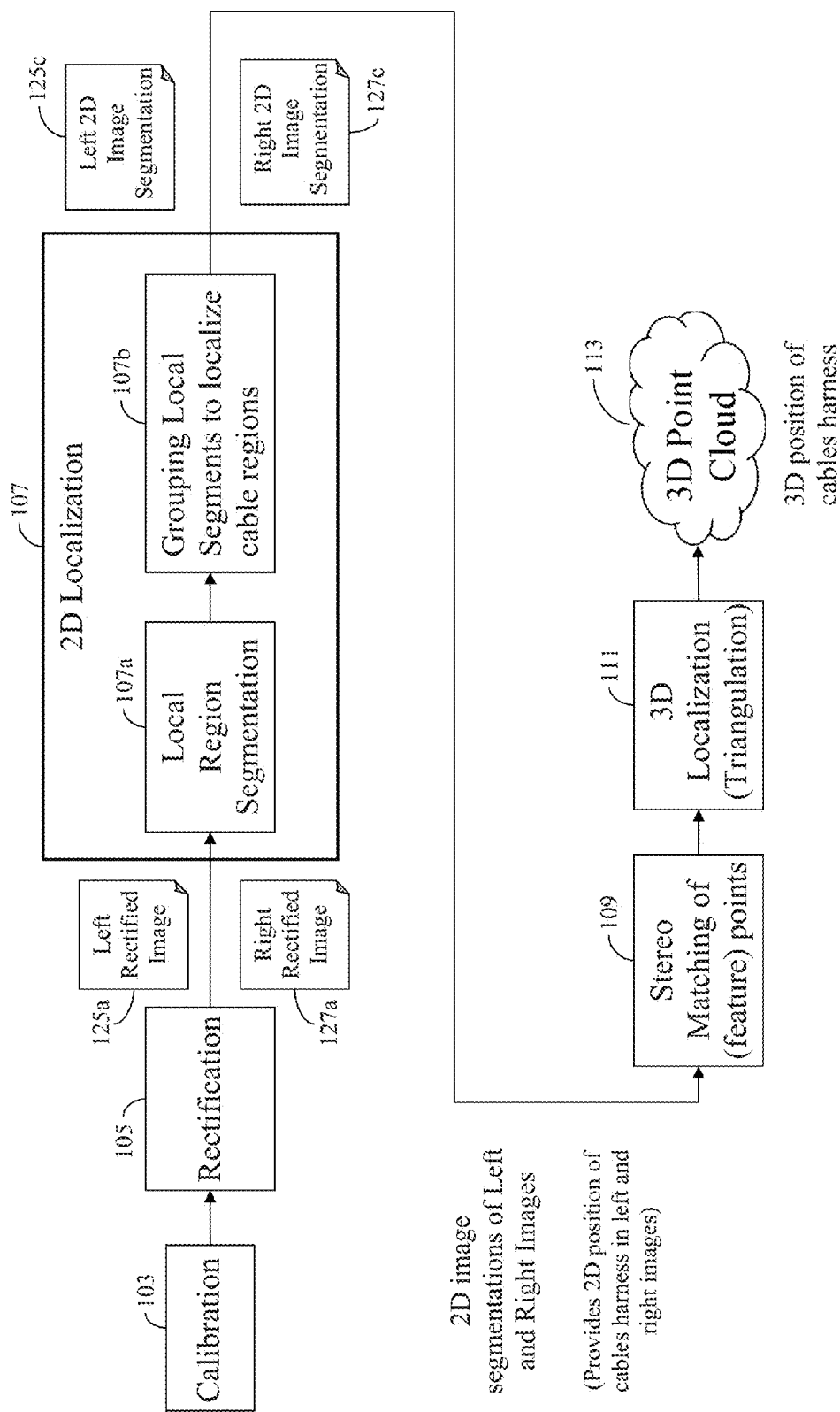
FIG. 15 shows an expanded view of the 3D Imaging System block of FIG. 12.

As illustrated in FIG. 15, the rectified left image 125a and the rectified right image 127a from rectification block 105 are passed to 2D localization block 107, which may be applied separately to each of the left 125a and right 127a images in turn, or both images may be optionally processed simultaneously. Preferably, 2D localization block 107 includes a first sub-block 107a for local region segmentation block and a second sub-block 107b for grouping the local segments produced by sub-block 107a into complete, localized cable regions. That is, the first sub-block 107a might not produce a perfect segmentation of a cable harness, but may instead break down a cable harness into multiple disconnected, partial segmentations, as is illustrated by the differently shaded segments in FIG. 14b.

The second sub-block 107a receives these multiple disconnected, partial segmentations from the first sub-block 107a, and identifies the disconnected partial segmentations that are likely from the same cable harness and connects them together (including by adding missing segmentation portions to fill in empty space between partial segments) to produce a complete segmentation of a whole cable harness, as illustrated by left image 125c and right image 127c in FIG. 14C. The output of 2D localization block 107 is a 2D image segmentation of each of the left image 125c and right image 127b. These two 2D image segmentations provide the 2D position of the cable harnesses in the respective, left and right images.

As an illustration, local region segmentation block 107a may define color-based, region growing produce local segmentations in an image. This may include a first step of selecting seed points whenever there is a pixel that is un-segmented. Then, for each seed point, the following steps may be applied iteratively. 1) Calculate the color similarity between the pixels in the current region and the nearest neighbor pixels; 2) Include candidate pixels to grow the region if similarity measures are higher than experimentally-set thresholds; and 3) Update the region color distribution and calculate the new principal component.

Alternatively, local segments may be defined using the method described in "Efficient Graph-Based Image Segmentation", by P. Felzenszwalb et al. IJCV, 2004, which is hereby incorporated by reference in its entirety.

This can result in multiple independent segments within a common cable harness, as is illustrated in locally segmented left image 125b and locally segmented right image 127b of FIG. 14B. These locally segmented images are then passed to block 170b, whose job is to join the multiple local segments within a common cable harness into a single (or a few larger) segment(s) spanning all (or a majority) of the cable harness, as is illustrated by grouped segments left image 125c and grouped segments right image 127c of FIG. 14C. The local segments (i.e. the cable segments) may be grouped into complete cables by the grouping together nearby cable segments (i.e. within 60 pixels) with similar appearance and consistent geometrical properties (e.g. orientation). Detailed steps may include: (Step 1) Identify the connecting endpoints of each cable segment with respect to its neighboring segments by using morphological dilation; (Step 2) Define a local window around the endpoints over the cable segment and compute the principal components (PCA) of the pixel colors and local shape orientation; (Step 3) Compute the color similarity and shape orientation similarity between neighboring segments using the PCA values computed in step (2); (Step 4) Group the neighboring segments if both similarity measure is higher than a experimentally-set threshold.

The locations of the composite, grouped 2D image segmentations that define the 2D position of the cable harness are output from 2D localization block 107 to stereo matching block 109, as is shown in FIG. 15.

Stereo matching block 109 is first of two functions. First is matching of corresponding points in the rectified left and right image, as is illustrated by stereo matching of (feature) points block 109a, and then is generation of a 3D point cloud of the physical cable harnesses represented in the rectified left and right images, as is illustrated by triangulation block 111. This results in the 3D position of cable harnesses relative to a reference point (and/or relative to each other). Since the 3D position of cable harnesses is defined by the 3D position of each matched (i.e. corresponding) point in the rectified left and right images, it also defines a 3D point cloud for each cable harness. FIG. 16 provides an example of the operation of stereo matching block 109 and triangulation block 111.

With reference to FIG. 16, an example of how the stereo matching of points (such as feature points) may be achieved as follows. For each cable point (e.g. feature point) in the left image, find its corresponding cable point in the right image. As mentioned above, the feature points may be found by SIFT or ASIFT, but the invention is not limited by these techniques. Any other feature-base descriptor technique known in the art may be used without deviating from the present invention. For example, an ORB-based feature descriptor may be used. Similarly, the search for corresponding feature points in the left image 130 and right image 132 may use a tree-based stereo matching technique, or any other feature point matching technique known in the art.

This search for matching i.e. corresponding, feature points may be facilitated by taking advantage of the left and right images being rectified. For example after rectification, corresponding cable points in the left image 130 and right image 132 lie in the same horizontal line, so the search for matching corresponding feature points may be limited to feature points on the same horizontal line. In any case, one can limit the search for a corresponding pixels (or feature points) in the right image 132 to the horizontal line that passes through the pixel being considered in the left image 130. That is, one can search the right-image pixels on the same row to find the best match with the closest feature point values. This is illustrated in FIG. 16 by multiple illustrated horizontal lines along corresponding (i.e. matched) left and right pixels. The search may optionally be further facilitated by using the segmentations as masks to further reduce the search region of the horizontal line.

Preferably, outliers are systematically rejected. This can be achieved by using global geometry constraint to reject pixels (i.e. points, or feature points) with disparities out of a defined range.

Triangulation block 109b then defines the 3D position for the points to define a perspective representation of a cable using the matched points in the left and right images. This may be achieved by using the homography, epipolar constraints, and/or triangulation and/or other techniques discussed above. For example, FIG. 16 shows the triangulation of a pair of corresponding pixels in left image 130 and right image 132 to determine cable point 126 in 3D space.

This triangulation operation may include the following. For each cable point, the 3D position is determined by the intersection of two lines, one connecting its left-image pixel and the left camera optical center, and another connecting the corresponding right-image pixel and the right camera center. For example with reference to FIG. 17, if one lets (x, y, z) be the 3D point in 3D space, and (u,v) and (u',v') denotes the corresponding pixels in the left image 130 and right image 132, and lets 3-by-4 matrices P and P' denote the camera matrices for the left and right cameras. Then Pi denotes the i-th row of P and Pi' denotes i-th row of P'. One can then use the camera projection equation to result in the equation of FIG. 17.

As an added example, FIG. 18 illustrates reconstructed 3D cable geometry in 3D space shown from two different views.

Returning to FIG. 12, given a stereo pair images of non-rigid objects, the point cloud 113 of the objects can be reconstructed. 2D segmentation of the objects in the input images are readily acquires, as illustrated by 2D localization block 107. The present invention addresses the open problem of providing an effective way to generate 3D primitive representations of non-rigid objects from the 3D point cloud 113 and the 2D image segmentations provided by 2D localization block 107. That is, each non-rigid object is represented by a set of 3D primitive shapes, and preferably represented by cylinders or rectangular prisms. The 3D primitive shapes function as bounding envelops of the local point clouds. Additionally, since robotic imaging systems typically include 2D imaging cameras, it is preferred that the 3D primitive shapes be defined using the 2D image information provided by the typical robotic imaging systems to estimate primitive shapes for robotic operations on cables. As illustrated by cable harness 116a, round cable units 115a are preferably represented by primitive cylinders 117a, and as illustrated by cable harness 116b, flat cable units 115b are preferably represented by primitive rectangular prisms 117b.

The present invention envisions two approaches toward achieving the task of primitive shape fitting block 119; a semi-automatic approach that requires user intervention (i.e. manual input from a human operator) to provide initial parameters and subsequently defines the 3D primitive shapes from the initial parameters, and a automatic approach that does not require any user intervention and self-determines all needed parameters to define the 3D primitive shapes in a fully automated process.

In the semi-automatic approach, which may be called a "naïve approach", the user specifies several key points on the 2D images. Theses key points may roughly label cable centers, e.g. various center points of the cables. For example, these labeled cable centers may roughly identify width centers at various spots along the length of a cable, or may identify the desired geometric center of a surface of the 3D primitive shapes, or more preferably may identify the desired lengths for the 3D primitive shapes. The algorithm/method for the semi-automatic approach then may use the given key points to cluster 3D point clouds and compute local primitives accordingly. It is to be understood that in addition to the labeled label cable centers, the end-points of the cables can be readily identified from the 2D segmentations as optional, additional key points.

As an example, FIG. 19 illustrates the labeling of cable centers on a rounded cables and FIG. 20 illustrates the labeling of cable centers in a flat ribbon cable.

Figure 21:
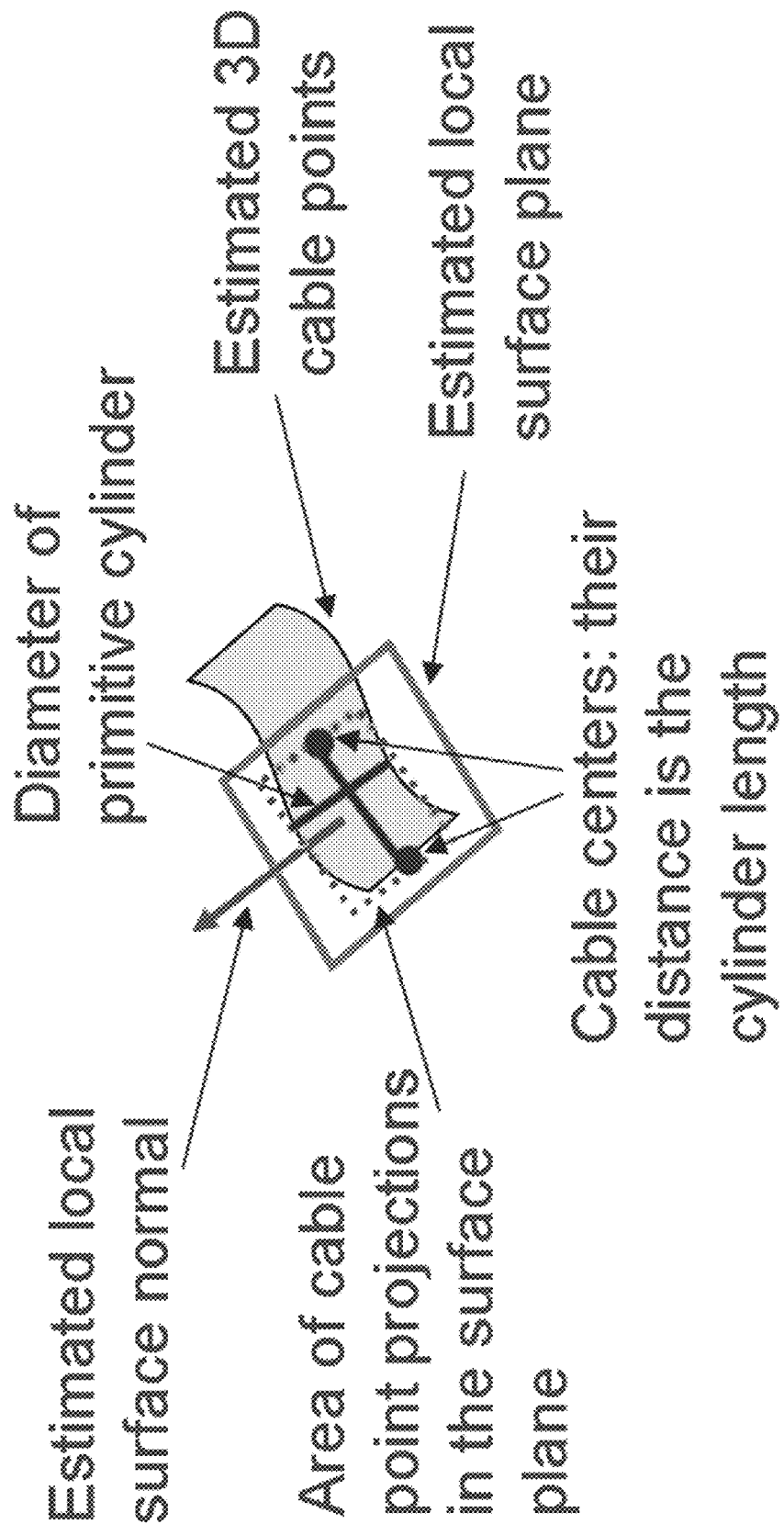
FIG. 21 illustrates an example of a process for determining 3D primitive shapes that is suitable for a semi-automatic approach, wherein key points are labeled along the length of a cable harness, or other imaged object.

FIG. 21 illustrates an example of a process for determining 3D primitive shapes that is suitable for a semi-automatic approach, wherein key points (including cable end-points and center points) are labeled along the length of a cable harness (as illustrated in FIGS. 19 and 20), or other imaged object. Given the cable centers, the distance of neighboring centers decides the length of local primitive cylinders, or length of a local primitive rectangular prism other or other 3D primitive geometric shape. A local surface plane is estimated on the point cloud within a local region defined by the neighboring centers. The cable points of the point cloud within the local region are then projected into the estimated local surface plane and the area of the projections is defined. The cable points are then projected to the direction perpendicular to the connecting line of labeled cable centers, and the range of the perpendicular projections decides the diameter of the local primitive cylinder, or width of a local primitive rectangular prism. If the primitive shape is a rectangular prism, its height can be determined by the range of cable points projected (perpendicular) to the local surface. The orientation of the cylinder or rectangular prism would follow (i.e. be parallel to) the orientation of the estimated local surface.

FIG. 22 illustrates a chain of 3D geometric primitives (i.e. cylinders) constructed using the approach of FIG. 21 (two views are provided).

It is to be understood that the approach of FIG. 21 may also be used with the automatic approach. For example, cable centers and end-points may be automatically located and labeled. This may be achieved by placing key points at opposite ends of a cable and placing additional key points at various points between the cable ends and along the cable length at known intervals.

The presently preferred automatic approach, however, makes use of a 3D primitive creation process that individually defines the widths/diameters and lengths of each 3D primitive shape in a chain of primitive shapes to better follow the curves and twists of the cable harness.

Figure 23:
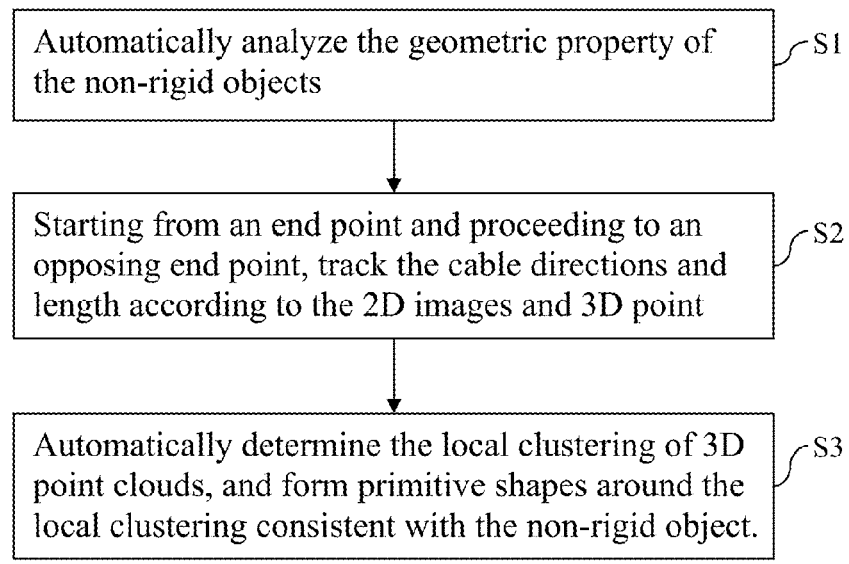
FIG. 23 provides an overview of the preferred automatic approach to defining chains of primitive shapes in accord with the present invention.

FIG. 23 provides a step overview of the preferred automatic approach to defining chains of primitive shapes in accord with the present invention. The preferred process starts by automatically analyzing the geometric property of the non-rigid objects, such as finding the end points of a cable, step S1. The process then starts from an end point and track the cable directions and length according to the 2D images and 3D point clouds, step S2. Automatically determine the local clustering of 3D point clouds, and primitive shapes consistent with the non-rigid object are formed, step S3.

Figure 24:
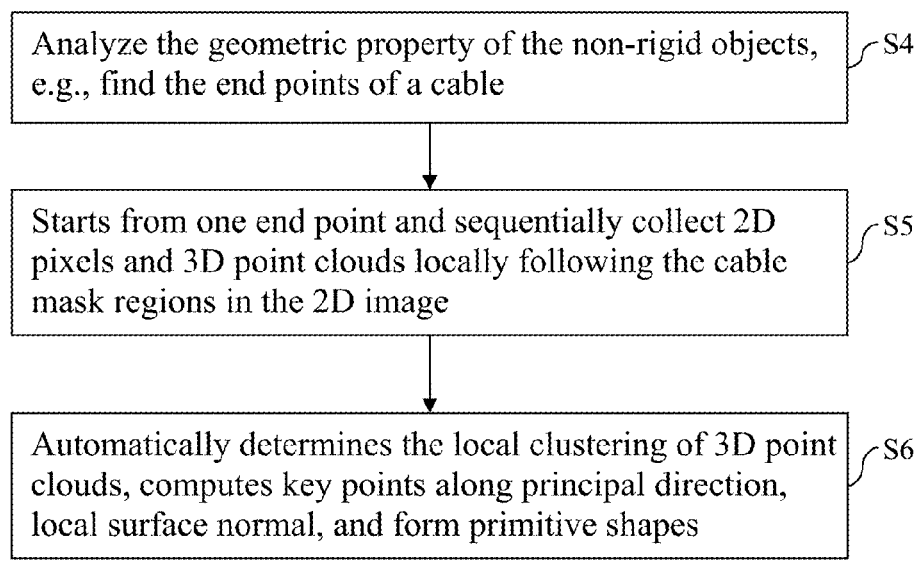
FIG. 24 provides a slightly more detailed overview than that provided in FIG. 23.

FIG. 24 provides a slightly more detailed overview than that provided in FIG. 23. Like before, the first step S4 starts by analyzing the geometric property of the non-rigid objects, e.g., find the end points of a cable. Then, step S5 starts from one end point and sequentially collect 2D pixels and 3D point clouds locally following the cable mask regions in the 2D image. That is, the cable mask regions can be defined by the 2D segmentations and the collected 3D cloud points correspond to the 2D pixels that defined by the 2D segmentations. Finally, Step S6 automatically determines the local clustering of 3D point clouds, computes key points along the principal direction, corresponding local surface normals, and forms primitive shapes.

Figure 25:
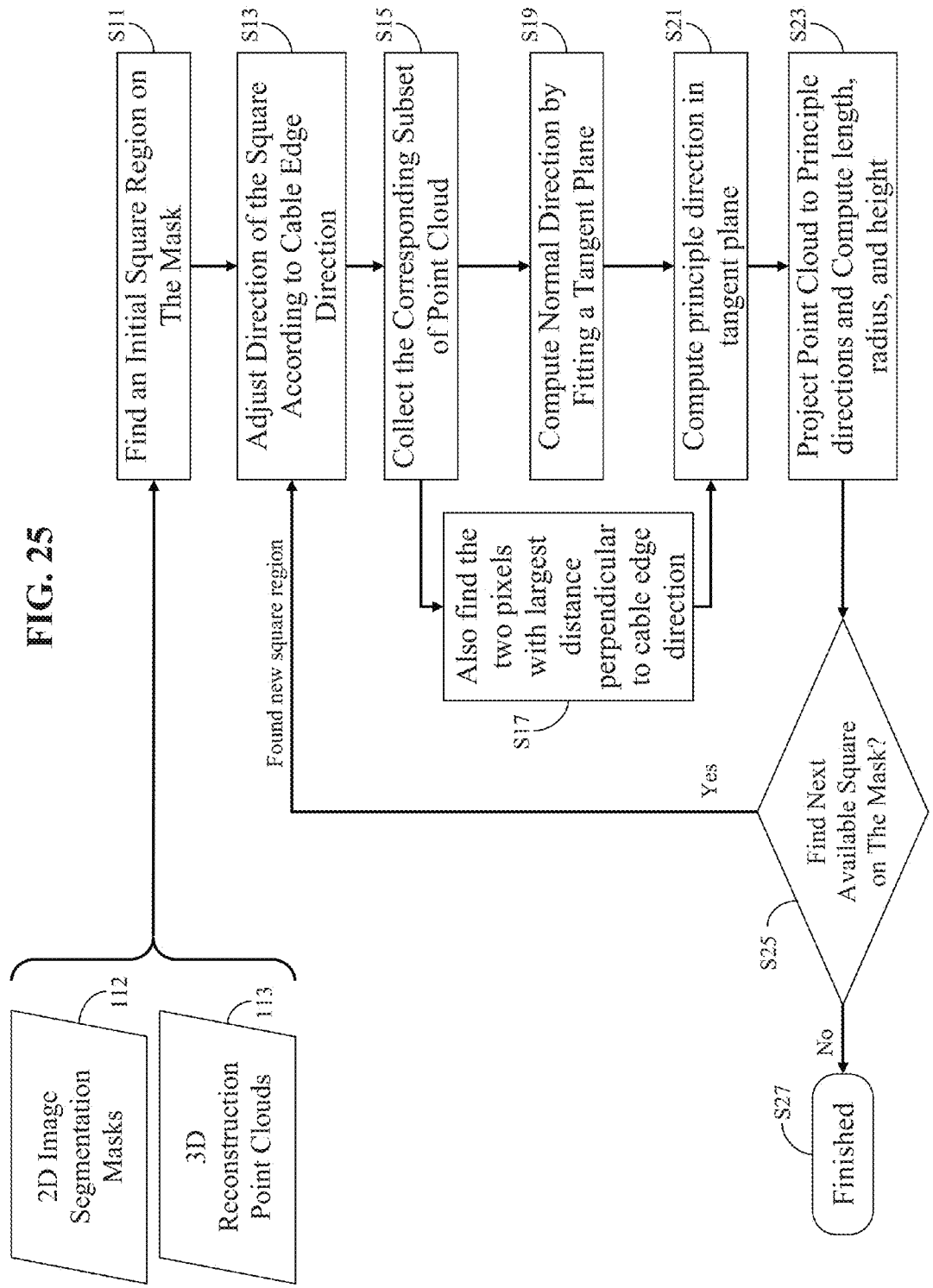
FIG. 25 shows a process flow for a preferred method of automatically identifying key points and constructing chains of 3D geometric primitives to follow the flow (or pose) of a cable or other non-rigid body.

FIG. 25 shows a process/method flow for a preferred method of automatically identifying key points and constructing chains of 3D geometric primitives to follow the flow (e.g. pose/orientation) of a cable or other non-rigid body. The process starts by obtaining 2D image segmentation mask(s) 112 and 3D point cloud(s) 113 of the object to be processed, such as illustrated in FIG. 12 for example. Since the system of FIG. 12 provides two 2D image segmentation masks (one from each of the left and right 2D images of a stereo image pair), the present process may be separately applied to each of the two masks, or applied to only a selected one of the two masks. If the present method is applied to both masks and both masks yield a separate chain of 3D geometric shapes, then the larger (or optionally the smaller) chain of 3D geometric shapes may be selected for use in any further process, such as by use in conjunction with a robotic arm.

The preferred method processes the 2D image segmentation mask 112 piecemeal, in sub-segments. Each sub-segment is processed separately until the entire 2D image segmentation mask 112 is processed. For ease of illustration, the present example uses square regions to define each sub-segment of the 2D image segmentation mask, but it is be understood that the individual sub-segments may be defined differently without deviating from the present invention. For example, other shapes may be used instead of a square, or the 2D image segmentation mask may be divided into a predefine number of sub-segments, and optionally each may be of equal length and/or area. In the present embodiment, each sub-segment is individually processed to identify key points within the sub-segment and to define a simplified 3D geometric shape for that individual sub-segment. For ease of discussion, the 2D image segmentation mask may optionally, and interchangeably, be identified simply as "mask". Thus, the next step S11 is to define an initial square region on mask.

FIG. 26 provides an example of a 2D image segmentation mask 201 that outlines (e.g. identifies or classifies as foreground) a cable 203 image from background components of a 2D image. The ends of the mask 201 (identified as "start" and "end") may be identified by determining the geodesic distance of mask 201. As it is known in the art, the geodesic distance between two points within a region is defined as the shortest path between those two points that lies completely within a defined region. In the present case, the defined region would be the mask or the 2D segmentation. The end-points of a mask may therefore be determined by identifying the two points on the mask with the greatest geodesic distance between them.

In the preferred method, the first square region is applied at one end of the mask 201, identified as the "start" end, and as each square is processed, additional square regions are applied down the principle direction of the mask 201 until the opposing end-point (identified as "end") is reached.

FIG. 27 illustrates the concept of principle direction. Multiple data points 209 are plotted on an X-Y axis. The principle direction is the direction along which there is the most change (i.e. most prominent variation) in data. In this case, arrow 207 identifies the principal direction in which data points 209 have the most variance. For illustration purposes, arrows 205 in FIG. 26 identify the principle directions of multiple regions of mask 205. In this manner, the principle direction of mask 201 provides a distribution path (i.e. directional path between the start and end points of mask 201) for the multiple square regions used to define sub-segments in mask 201.

Figure 28:
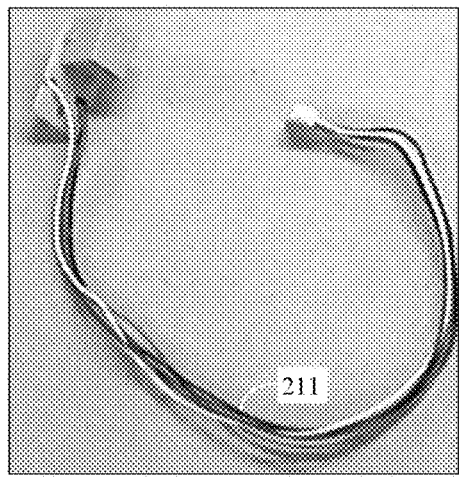
FIG. 28 provides another example of a cable 211 upon which the present process for representing a 3D cable as a chain of simplified 3D geometric shapes is applied.
Figure 29:
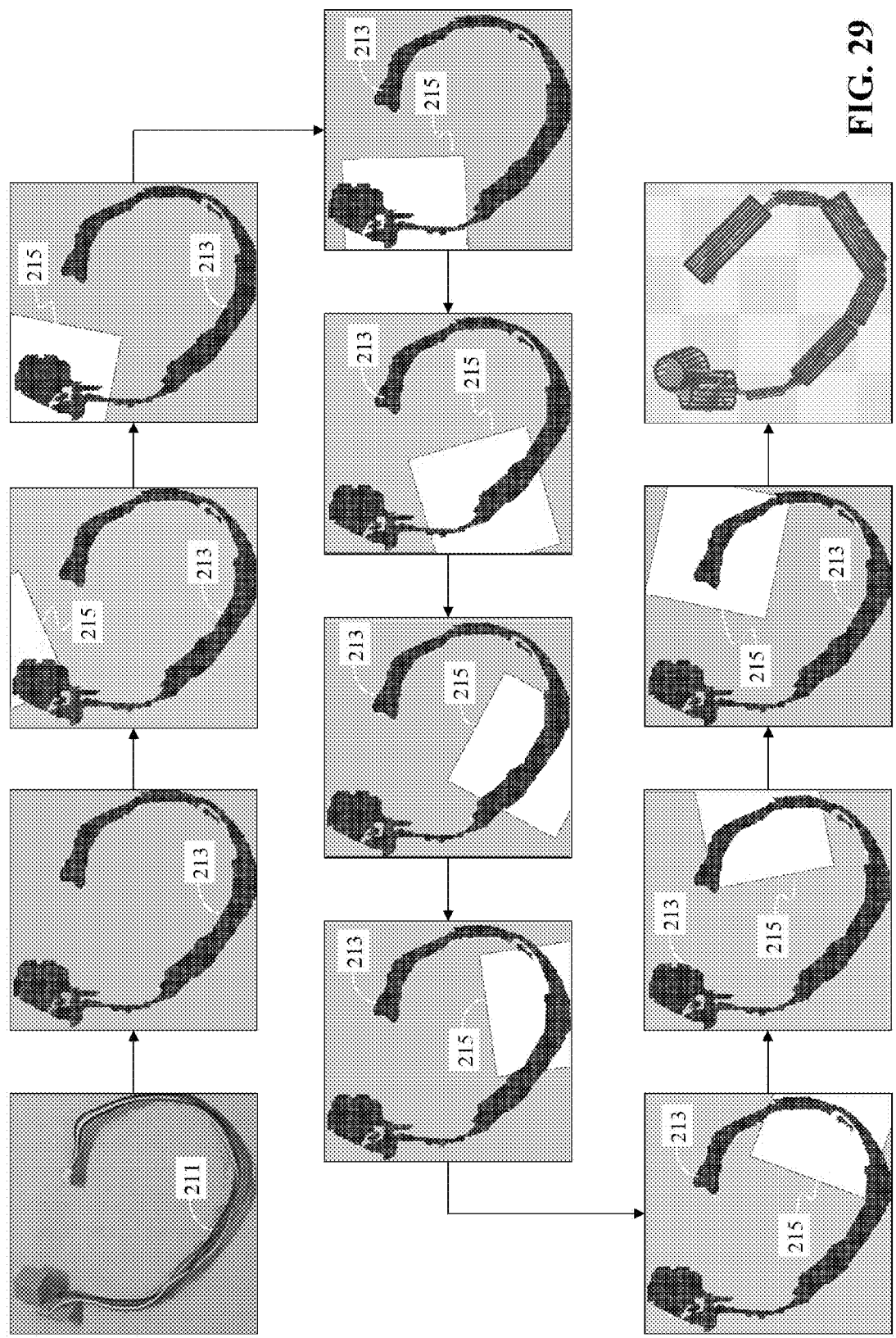
FIG. 29 shows cable 211 and a progression of square regions 215 along a principle direction of a 2D image segmentation mask 213 of cable 211 from a start point to an end point.

FIG. 28 provides another example of a cable 211 upon which the present process for representing a 3D cable as a chain of simplified 3D geometric shapes is applied. FIG. 29 shows cable 211 and a progression of square regions 215 along a principle direction of a 2D image segmentation mask 213 of cable 211 from a start point to an end point. Each square region 215 defines a sub-segment of mask 213 that is individually processed using the method of FIG. 25, as is explained more fully below. Basically, the preferred method automatically traces the local square regions (or patches) on the 2D image (as determined from the 2D segmentation mask) according to a prior (i.e. previous) fitting result. That is, to determine (1) the neighbor location, one may (2) re-use the principal direction of the prior primitive as initial principal direction to determine the principle direction of the neighbor location. This reduces processing time. Furthermore, the square regions 215 used to define each sub-segment of mask 213 are preferably of equal size, but other shapes of differing sizes may also be used.

Returning to FIG. 25, once an initial square region has been defined on the mask (step S11) at the "start" point, the next step is to adjust the orientation of the square region in accordance with the orientation of the mask, step S13. More specifically, the square is rotated and centered according to the primary cable edge direction. Optionally, this primary cable edge direction may be determined from the gradient of the edge pixels in the 2D image sub-segmentation or the 2D image. The square may be rotated so that two of its sides are parallel to the principle direction of mask edge pixels (or optionally the principle direction of the mask sub-region) within the square region. Each square location is processed in a similar manner, and so an example of a square region 215 adjusted according to the cable edge direction is illustrated in FIG. 30, which shows square region 215 when it has reached an intermediary point between the start and end points of mask 213.

Figure 30:
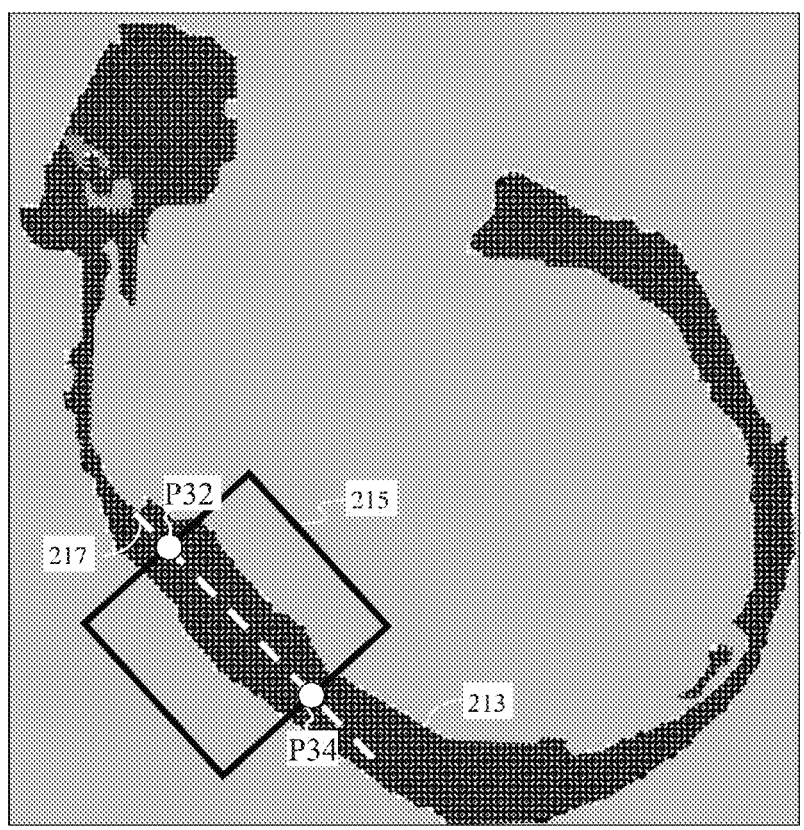
FIG. 30 shows square region 215 at an intermediary point between the start and end points of mask 213.

As illustrated in FIG. 30, for each local patch 215 on the 2D image 213, the preferred method may (1) adjust the local square principal direction 217 by computing statistics of the gradient on edge pixels, and (2) compute the key point pixels P32 and P34 according to the principal directions 217. Another example of this is provided in FIG. 31.

Figure 31:
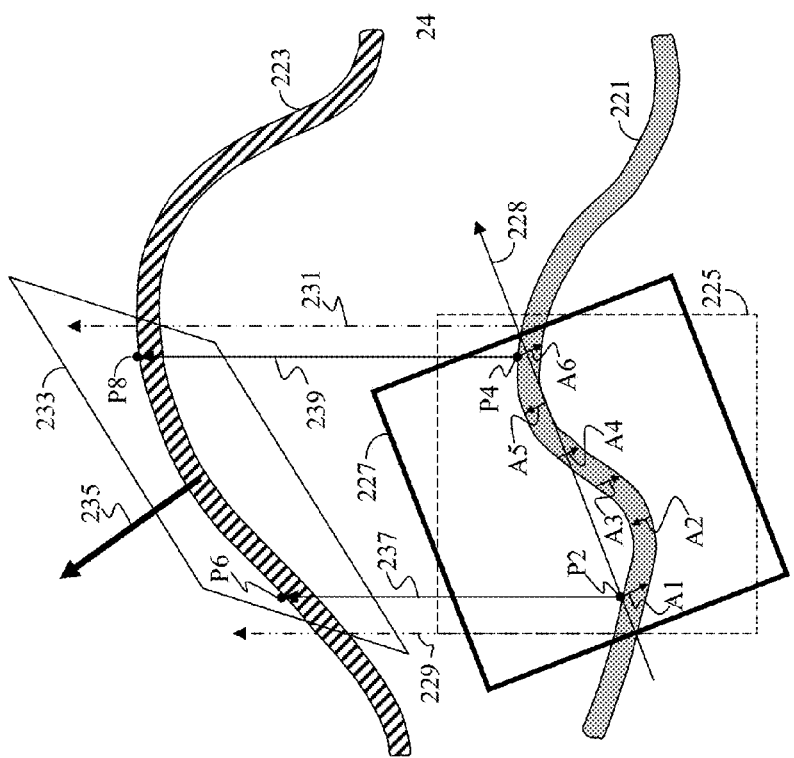
FIG. 31 illustrates a partial view of a 2D image segmentation mask 221 of another sample cable, not shown, and the cable's corresponding 3D point cloud 223.

FIG. 31 illustrates a partial view of a 2D image segmentation mask 221 of another sample cable, not shown, and the cable's corresponding 3D point cloud 223. Dash lines 225 shows an initial position for a square region 227 on mask 221, and arrow 228 illustrates the primary cable edge direction (or alternatively the principle direction of mask edge pixels) within the mask sub-segment defined by the initial position of square 227. Consequently, square 227 is rotated and centered to its shown final position to be aligned with arrow (or line) 228.

Returning to FIG. 25, the next step S15 is to collect the 3D points of 3D point cloud 113 that correspond to the sub-segment of the mask defined by the adjusted square of step S13 at its final position, as is illustrated by phantom lines 229 and 231 in FIG. 31. For reference purposes, these collected 3D points will be termed a sub-3D cloud. The corresponding 3D points can be readily collected since an index correlating pixel pairs (and hence 2D points on the mask) of the stereo image pair to their triangulated 3D points that make cup 3D cloud 113 was already constructed by stereo matching block 109 and 3D localization block 111 of FIG. 12.

At this stage, the main processing path diverts into two paths. A first processing path (comprised of step S17) processes the sub-segment of mask 112, and the second processing path (comprised by step S19) processes the sub-3D cloud. Step 19 computes a normal direction (indicated by arrow 235) to the sub-3D cloud by fitting a normal tangent plane 233. Step S17 identifies the two points in the sub-segment mask with the largest distance perpendicular to the cable edge direction. This may be implemented by several approaches, some of which are discussed below. One approach is to project all the 2D points of the sub-segment mask perpendicularly to the primary cable edge direction and determine the projection distance to a cable edge, as is illustrated by arrows A1, A2, A3, A4, A5 and A6. In this illustration, arrows A1 and A6 are the longest. Therefore, 2D points P2 and P4, which correspond to arrows A1 and A6, have the largest distance perpendicular to the cable edge direction.

In the example of FIG. 30, points P32 and P34 are the two key points having the largest distance perpendicular to the cable edge direction (indicated by dash line 245) in the sub-segment 215 of mask 213.

Returning to FIG. 25, the two divergent paths now converge at step S21, which computes a principle direction on the tangent plane. The two 3D points that correspond to the two key points that have the largest distance perpendicular to the cable edge direction are identified. In the present example, 2D points P2 and P4 have the largest distance, and they correspond to 3D points P6 and P8, as illustrated by arrows 237 and 239, respectively.

3D points P6 and P8 may be used to determine a length of the simplified 3D geometric shape that is yet to be constructed. This may be done by projecting the 3D points within sub-3D cloud onto local tangent plane 233, determining the principle direction of the projected points of the tangent plane, and then defining cut-off lines on the tangent plane at the projection points that correspond to 3D points P6 and P8. These cut-off lines may be perpendicular to principle direction of the projected points on the tangent plane, and the distance between the cut-off lines may determine the length of the 3D primitive shape to be constructed. The cut-off lines may also define a new sub-set of 3D points. That is, the 3D points that correspond to the projected points between the cut-off lines on the tangent plane may define the 3D points that should be enclosed by the 3D primitive shape that is to be created.

Figure 32:
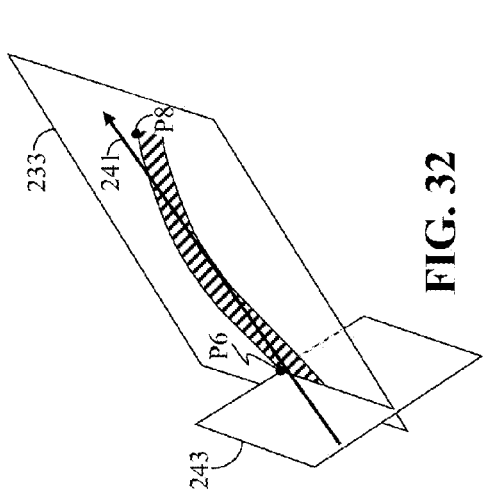
FIG. 32 illustrates the defining of the principle direction on a tangent plane defined by a sub-section of the 3D cloud.

3D points P6 and P8 may also be used to determine a length of the simplified 3D geometric shape by defining cut-off planes. For example, 3D points P6 and P8 may define cut-off planes perpendicular to local tangent plane 233. For illustration purposes, only one cut-off plane is shown in FIG. 32. That is, cut-off plane 243 is defined by point P6 and is perpendicular to tangent plane 233. It is to be understood that point P8 similarly defines a second cut-off plane perpendicular to tangent plane 233, but it is not shown in order to not unduly obscure other elements of the drawing. The process defined by step S21 may be optionally applied to all the 3D points encompassed by the sub-3D cloud. However, since 3D points P6 and P8 define cut-off planes, the process defined by step S21 may optionally be applied only to the 3D point sub-cloud (or 3D patch) between the cut-off planes that pass through 3D points P6 and P8, as illustrated in FIG. 32.

Irrespective of whether the entire sub-3D cloud is processed or only the reduced cloud portion defined by cut-off 3D points P6 and P8 is processed, the principle direction on tangent plane 233 of the processed 3D points is determined, as indicated by arrow (or line or axis line) 241. This may be done by projecting all the 3D points that are being processed onto tangent plane 233, and then determining the principle direction of the resultant projected points on tangent plane 233.

Figure 33:
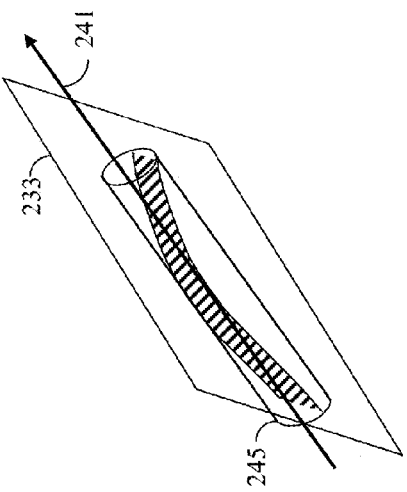
FIG. 33 illustrates the projection of 3D points to the principle direction on the tangent plane.

As shown in FIG. 25, the next step S23 is to project the 3D points that are being processed (i.e. the 3D points between the cut-off planes defined by 3D points A6 and A8, or the entire sub-3D cloud defined by square 227) to the principle direction arrow (i.e. line) 241. The range of all the projected arrows may define the diameter of resultant 3D cylinder 245, as is illustrated in FIG. 33, and the distance on tangent plane 233 between projections of points A6 and A8 may define the length of resultant 3D cylinder 245. Preferably, the faces of the cylinder are defined by planes normal to principle direction 241.

With the current primitive, 3D geometric shape thus constructed, the next step S25 determines if there is another available (i.e. not yet processed) square on the mask. In other words, excluding the mask point that have already been processed, can another square be placed down the path from the start point to the end point of the mask to construct another primitive 3D geometric shape. As is illustrated in FIG. 29 the number of squires spans from start-to-end points of the mask. If another square is found (S25=Yes), then processing returns to step S13 and the newly found square is processed. If another square is not found (S25—No), then one proceeds to step S27, and processing ends.

Figure 34:
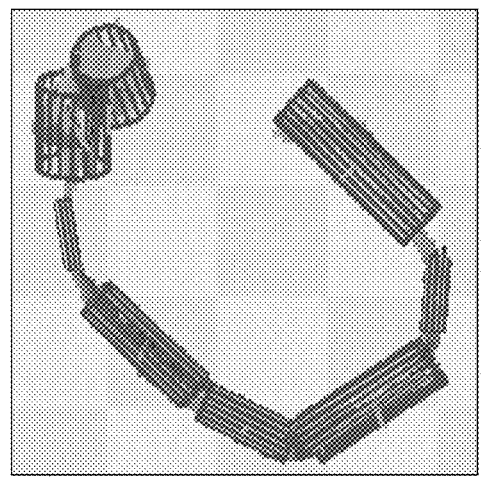
FIG. 34 illustrates the result of applying a preferred process on the cable of FIG. 28.

FIGS. 29 and 34 illustrate the result of applying the present process on the cable of FIG. 28. To recapitulate, the adjusted rectangular region on the 2D image defines the corresponding 3D points that are used for fitting a 3D primitive shape. The process flow may be summarized as follows: First compute principal direction in 3D space according to the key points in 3D point cloud; Second, compute local surface normal direction by fitting a tangent plane on the patch of 3D points (i.e. sub-3D cloud); Third, project these 3D points onto the tangent plane, and then compute a bounding rectangle along the principal direction. Last, construct a primitive shape (cylinder or box, according to the object type) using the principal directions, bounding box, local surface normals, and other needed parameters as described herein.

Figure 35:
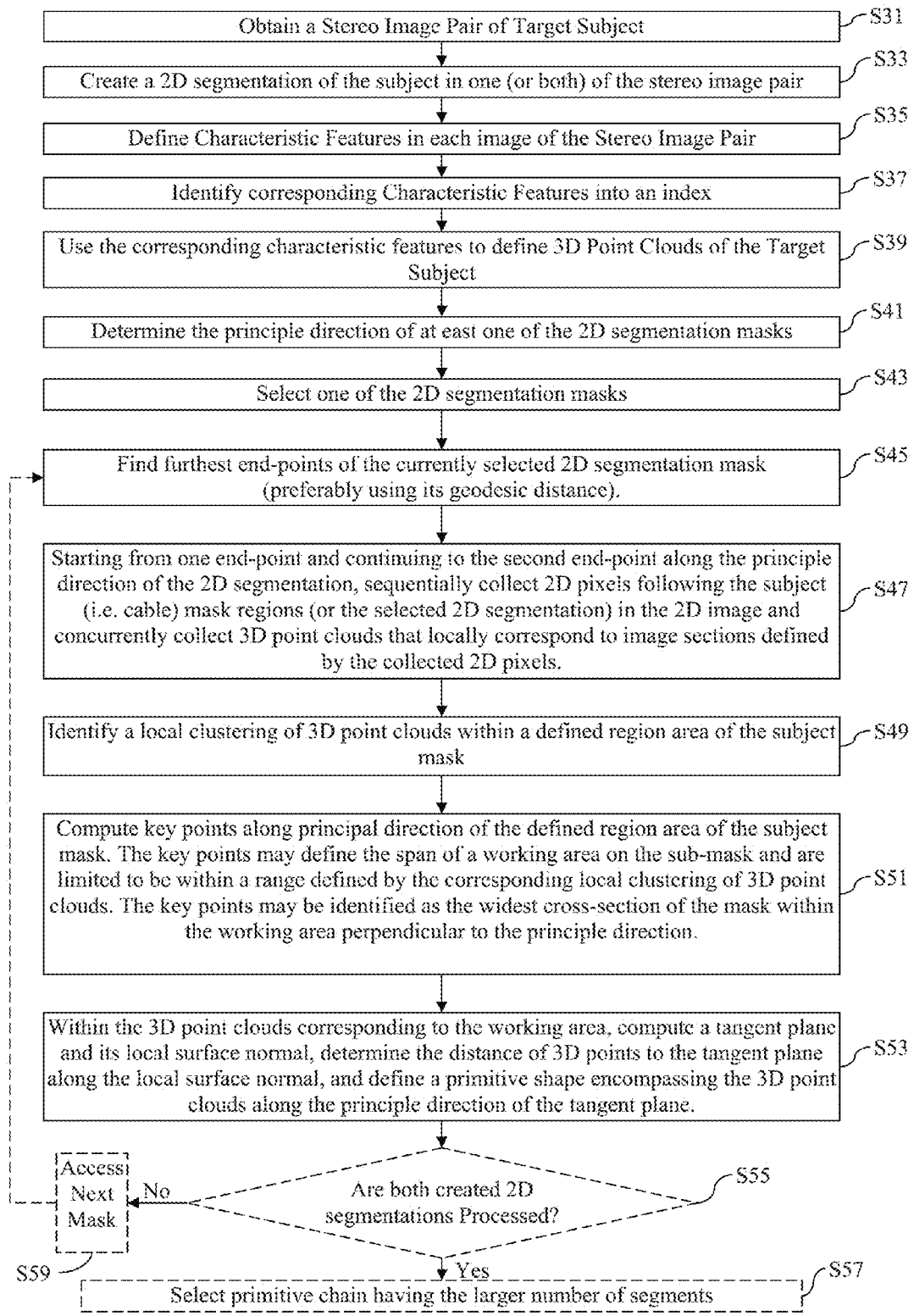
FIG. 35 provides another flowchart for a method in accord with the present invention.

FIG. 35 restates the method of FIG. 25 in a more linear fashion, and provides additional details and optional changes. The method of FIG. 35 may be better understood with reference to FIGS. 36A and 36B, which provide a pictorial representation of some of the method steps of FIG. 35.

Figure 36A:
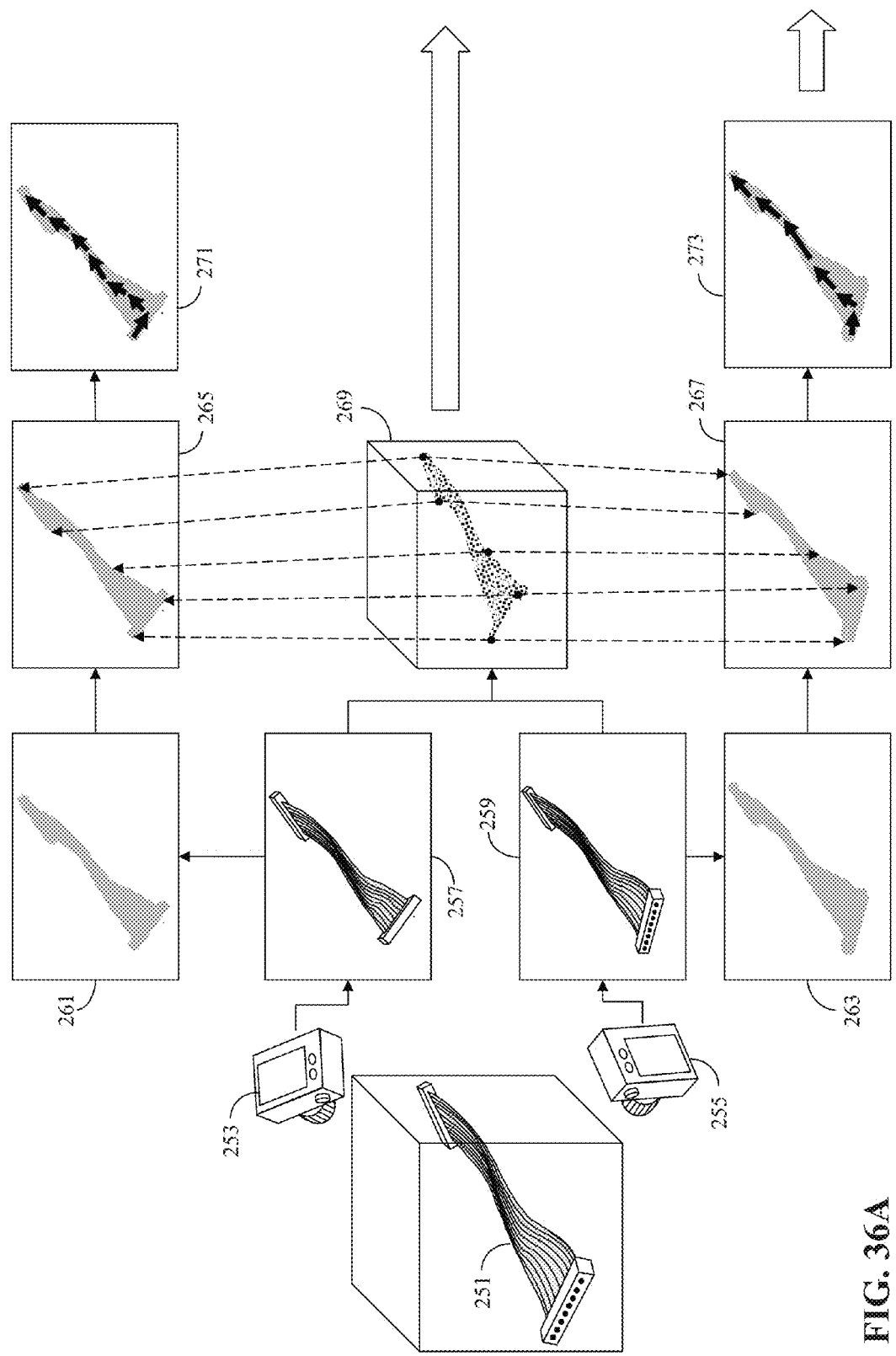
FIGS. 36A and 36B illustrate various aspects of the present invention.

The present method starts by obtaining a stereo image pair of a target subject, at step S31. As is illustrated in FIG. 36A, the target object may be a flat ribbon cable 251, or any other non-rigid 3D object. The stereo image pair (i.e. 2D images 257 and 259) may have been previously obtained and stored, and thus may be accessed from an electronic memory store (e.g. Flash memory, hard drive, RAM, optical memory, etc.), not shown. Preferably, however, images 257 and 259 obtained in real-time by a pair of calibrated, stereo cameras 253 and 255.

The order of the next two steps is not critical, but it is presently preferred that step S33 of constructing 2D segmentation masks 261 and 263 of images 257 and 259, respectively, be implemented first. In this manner, the next step S35 may be limited to regions of images 257 and 259 that correspond to the 2D segmentation masks 261 and 263. Otherwise, characteristic features of the entirety of images 257 and 259 may be generated. Irrespective, step S35 defines characteristic features (e.g. feature points, such as ASIFT feature points, for example) in each 2D image 257 and 259 that make up the stereo image pair produced by stereo camera pair 253/255. This results in a 2D distribution of feature points. Step S37 then identifies corresponding characteristic features point in 2D image 257 and 259, and may optionally arrange them into an index.

Step S39 then uses the corresponding characteristic feature points to define a 3D point cloud 269 of the target subject 251 through triangulation, or other known method in the art. This is illustrated in FIG. 36A by indicating 5 pairs of corresponding feature points (within areas of image 257 and 259 as determined by masks 265 and 267, respectively) being combined to define five 3D points within 3D point cloud 269.

Step S41 may optionally be implemented at this point, or at a later point when it becomes necessary to place a new square region (or other shape region) along the length of one of the two 2D segmentation masks. Step S41 determines the principle direction for one or both of the 2D segmentation masks, as is illustrated by boxes 271 and 273 in FIG. 36A.

Figure 36B:
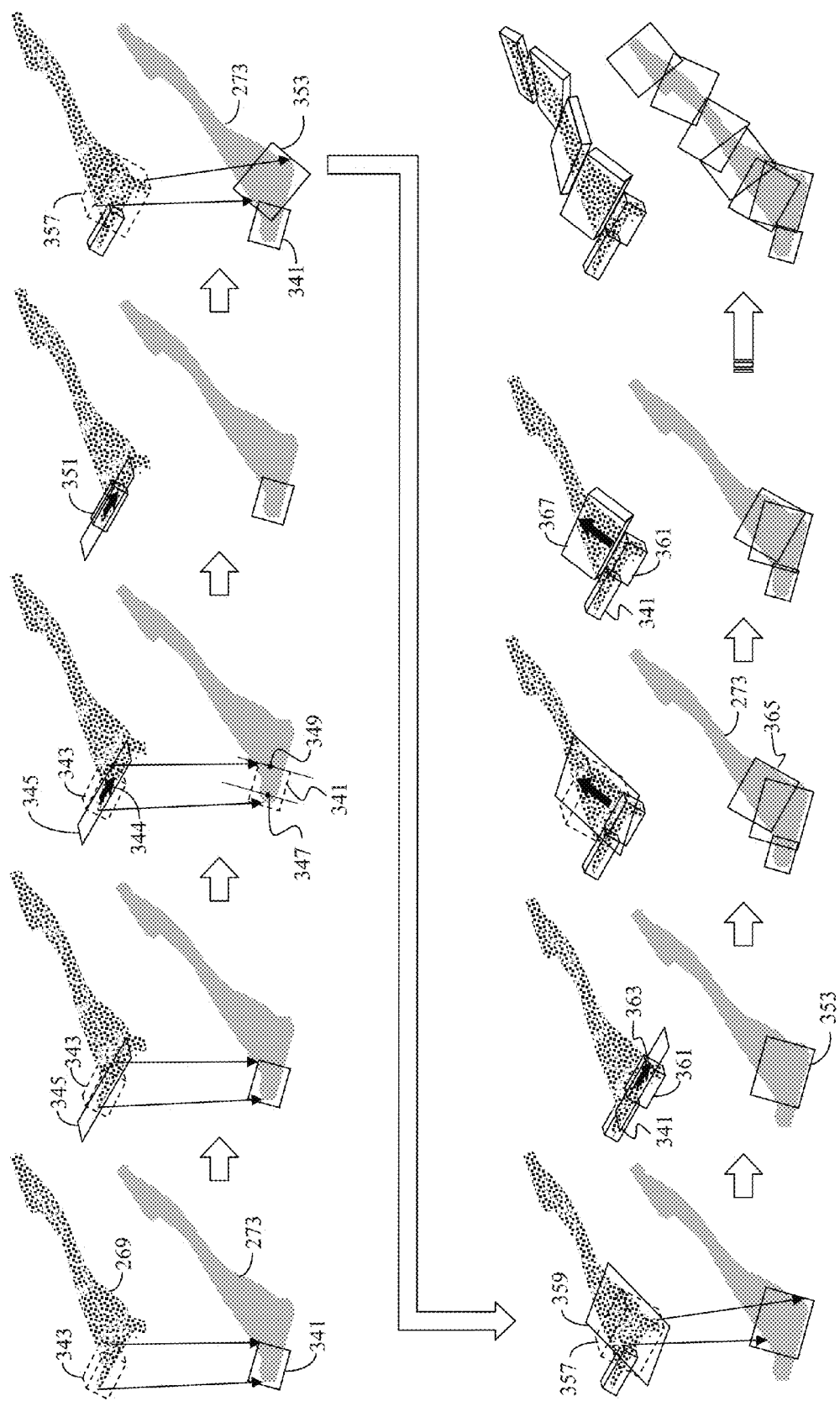

Steps S45 to S53 may be applied to both, or to either one of 2D segmentation masks 271 and 273. If applied to both masks, then both masks may be processed in parallel or sequentially. In the present example, it is assumed that 2D segmentation masks 271 and 273 will be processed sequentially. Therefore, step S43 is to select one of the 2D segmentation masks 271 or 273 to process first. In the example of FIG. 36A, mask 273 is selected first in step S43, and the further processing of mask 273 and 3D point cloud 269 are illustrated in FIG. 36B.

Step S45 is similar to step S11 of FIG. 25, and its task is to find the furthest end-points of the currently selected 2D segmentation mask. As is explained above, this may be achieved by identifying the two points with the largest geodesic distance. One of these two points will be the start point, and the other will be the end point, and one will proceed from the start point to the end point following the principle direction of the currently selected 2D segmentation mask. Thus, if desired, this step may be incorporated into S41 and the start/end points determined at the time that the principle direction is determined.

In step S47, starting from one end-point (i.e. the start point) and continuing to the second end-point (i.e. the end point) along the principle direction of the 2D segmentation, sequentially collect 2D pixels in region clusters following the subject (i.e. cable) mask regions (or the selected 2D segmentation) in the 2D image and concurrently collects 3D point clouds that locally correspond to image sections defined by the collected 2D pixels. This may correspond to steps S13 of the method of FIG. 25. As is explained above, the region clusters may be defined by a square (e.g. square 215 in FIG. 31) or other (geometric) shape.

For each sub-segmentation square, step S49 identifies the 3D points that correspond to the 2D points within the respective sub-segmentation square. This may correspond to step S15 of the method of FIG. 25. That is, step S49 identifies a local clustering of 3D point clouds that correspond to the defined square regions of the subject mask.

Figure 37:
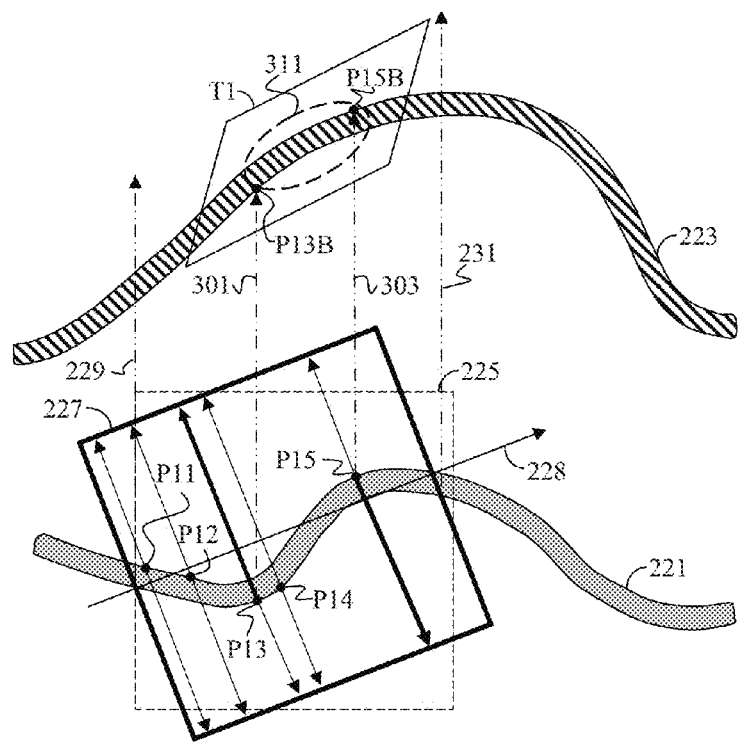
FIG. 37 illustrates another method of implementing a step of the present invention.

Steps S51 and S53 are applied to each square (i.e. region cluster) defined by step S47. It is to be understood that step S47 may be implemented as illustrated in FIG. 31, and the 3D points of 3D point cloud 223 that correspond to the sub-segment mask defined by square 227 may be gathered into a sub-3D cloud, as describe above. FIG. 37, however, provides an optional variation in place of the method illustrated in FIG. 31.

With reference to FIG. 37, wherein all elements similar to those of FIG. 31 have similar reference characters and are described above, an optional variation to the method of FIG. 31 is illustrated. Like in the previous example of FIG. 31, FIG. 37 shows an initial position and orientation of a square region 225, and its final position and orientation (labeled 227) once square 225 is aligned with the primary direction of edge pixels (i.e. 2D points) on 2D segmentation mask 221. Also as before, square 227 defines a sub-segment mask of the 2D points of mask 221 that lie within square 227, and further define a portion of 3D point cloud 223 as illustrated by dotted arrows 229 and 231. However, unlike the example of FIG. 31, the working sub-3D cloud is preferably not defined by all the 3D points that correspond to 2D pixels within the entire sub-segment mask defined by square 227. In an alternate implementation, steps S17 and S19 are computed sequentially with step S17 being implemented first.

Therefore, step S51, which may correspond to step S17 of FIG. 25, is implemented next and it identifies two key points within square region 227, and the sub-3D point cloud is preferably defined as all the 3D points that lie between the two 3D points that correspond to these two key points, as is stated as part of step S53. Further optionally, the two key points may be determined by an alternate method.

For example, step S51 (and step S17) may be implemented as described in FIG. 31, but may optionally be implemented as described FIG. 37. In this alternate implementation, the distances perpendicular to cable edge direction is defined by centering square 227 on the principle direction line 228 defined by the edge pixels of mask 221, and the direction are taken from all pixels within square 227 out to the sides of square 227 parallel to principle direction line 228. In the present example, points P11, P12, P13, P14 and P15 are shown for illustration purposes. Of these, points P13 and P15 have the largest distances, as is illustrated by darken arrows. Thus, points P13 and P15 would constitute the two key points identified within square 227.

Figure 38:
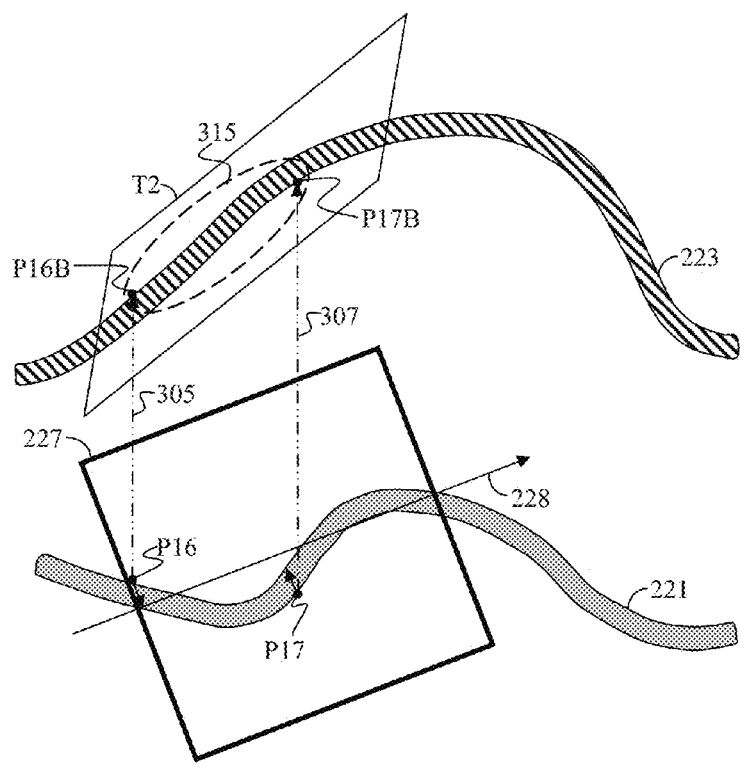
FIG. 38 illustrates still another method of implementing a step of the present invention.

FIG. 38 illustrates a case where the two key points are determined by identifying the two 2D points on the sub-segmentation mask defined by square 227 that have the largest distance across the width of sub-segmentation mask 227, where the width is defined perpendicular to principle direction line 228. In this illustration, points P16 and P17 have the largest distances, and they are therefore deemed the two key points for square region 227.

Irrespective of whether the two key points are determined using the method FIG. 31, 37 or 38, as stated in step S51 the two key points define the span of the working area within the mask 221. Thus, once the two key points have been identified, the two 3D points that correspond to these two key points are identified.

In FIG. 37 the two corresponding 3D points are identified by dash arrows 301 and 303 leading from points P13 and P15 to their corresponding 3D points P13B and P15B, respectively. 3D points P13B and P15B define the span of 3D points within a working 3D region. That is, the 3D points between P13B and P15B constitute a sub-3D cloud 313.

In FIG. 38 the two corresponding 3D points are identified by dash arrows 305 and 307 leading from points P16 and P17 to their corresponding 3D points P16B and P17B, respectively. 3D points P16B define P17B the breath of a sub-3D cloud 315.

Step S53 corresponds to steps S21 and S23 of FIG. 25, with the exception that the process is applied to the sub-3D cloud defined by the two key points. Step S53, within the sub-3D cloud corresponding to the working area, computes a tangent plane and its local surface normal, determine the distance of 3D points to the tangent plane along the local surface normal, and defines a primitive shape encompassing the 3D point clouds along the principle direction of the tangent plane.

For example in FIG. 37, local tangent plain T1 is defined from the sub-3D cloud 311 defined from key points P13 and P15. Similarly in FIG. 38, local tangent plain T2 is defined from the sub-3D cloud 313 defined from key points P16 and P17.

Assuming that the method of FIG. 38 is used, the implementation of step S53 is illustrated in FIGS. 39 to 43. FIG.

39 shows local tangent plane T2 at a distance from sub-3D cloud 315, but this for illustrative purposes in order to emphasize the projection of 3D points onto local tangent plane T2 to define a set of data points 317 on tangent plane T2. Data points 317 represent the 3D point projections. The principle direction (identified as arrow, line, or axis line 319) of data points 317 on tangent plane T2 can then be determined. FIG. 40 illustrates the resultant principle direction line 319 on plane T2 within the sub-3D cloud 315. FIG. 41 then shows the projection of 3D points within the sub-3D cloud 315 onto principle direction arrow (or line) 319. The principle direction thus defines the orientation of the primitive 3D geometric shape that is to be created. As illustrated in FIG. 42, 3D points P16B and P17B determine the length of the final 3D primitive shape. FIG. 43 illustrates a cylinder 321 resulting from the present implementation.

Returning to FIG. 35, if only one 2D segmentation mask is to be processed, then processing ends with step S53 and the resultant chain of 3D primitive shapes is output. However, if it is desirable to apply the present method to both 2D segmentation masks 271 and 273, as illustrated in FIG. 36A, then step S55 determines if both 2D segmentation masks 271 and 273 have been processed. If not (S55=No), then step S59 selects the 2D segmentation mask that has not yet been processed, and returns to step S45. Otherwise (step S55=Yes), then step S57 select primitive chain that has the larger number of segments.

FIG. 36B illustrates various stages of the processing of 2D segmentation mask 273 of FIG. 36A. For example, FIG. 36B shows a first square region 341 at a starting point of mask 273. Square region 341 defines portion 343 of 3D cloud 269. Assuming that the process shown in FIG. 36B follows the process of FIG. 31, a local tangent plane 345 is defined using the sub-3D cloud 343. Two key points 347 and 349 are then identified in square region 341. These key points determine a working set of 3D points within sub-3D cloud 343. This working set of 3D points is then projected onto tangent plane 345 and the principle direction 344 of the projected 3D points on plane 345 is determined. The working set of 3D points are then projected onto the principle direction line 344 to determine a cross-sectional area for the primitive 3D geometric shape that is to be constructed. Using this determined area to calculated width and height values, and using the 3D points that correspond to key points 347 and 349 to determine a length, a rectangular prism 351 is defined.

With the first rectangular prism 351 thus constructed, a next square region 353 is defined down the principle path of 2D segmentation mask 273. As shown, the square regions 341 and 353 may be of different sizes. A new sub-3D space 357 is defined from new square region 353. Subsequently, a new local tangent plain 359 is constructed from the sub-3D space 357. Following the identification of two key points within square region 353, the working set of 3D points defined by these key points are projected onto tangent plane 359 and a principle direction 363 of the projected 3D points is determined. Finally, a second rectangular prism 361 is defined next to the first rectangular prism 341.

Following this sequence, a third square region 365 is defined down the principle direction of 2D segmentation mask 273. Repeating this process results in a third rectangular prism 367. This process is repeated until the end point of 2D segmentation mask 273 is reached, as is illustrated if FIG. 36B.

FIG. 44 provide an example of a 2D/3D location determined from a stereo image pair, and the resultant primitive 3D geometric shapes constructed using an automated method in accord with the present invention.

It is to be understood that any and all of the above described method steps may be implemented in a computing device, such as personal computer. Other examples of computing device include a CPU (Central Processing Unit), PLD (Programmable Logic Device), CPLD (Complex Programmable Logic Device, ASIC (Application-Specific Integrated Circuit) circuit, etc., and that methods to integrate these device electronic memory stores or digital cameras are generally known in the art.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method of generating a 3D (three dimensional) geometric primitive representation of a physical cable harness as a target object for use in robotic manipulation of the cable harness, said method comprising:
 using a data processing device to implement the following steps:
 accessing a 3D point cloud representation of the target object at a given pose position;
 accessing a 2D (two dimensional) image segmentation of the target object, wherein the 2D image segmentation is generated from a 2D image of the target object at said given pose position;
 identifying a working region on said 2D image segmentation, said working region having a first pair of opposing boundaries traversing the 2D image segmentation across its principle direction, said first working region being sized to enclose all parts of the 2D image segmentation that lie between its opposing boundaries and being smaller than the total area of 2D image segmentation; and
 starting with said working region and repeating for a plurality of said working regions distributed along said 2D segmentation until a majority of said 2D segmentation is processed by working regions, implementing the following steps for each working region:
 (i) defining the portion of the 2D image segmentation enclosed by the working region as a 2D image sub-segment;
 (ii) defining as a cable-segment direction, a linear direction determined from a gradient of edge pixels within the 2D image sub-segment;
 (iii) within the 2D image sub-segment, identifying, as first and second key points, pixels having the largest distance perpendicular to the cable-segment direction and still bound by the 2D image sub-segment;
 (iv) identifying first and second key 3D points that respectively correspond to the first and second key points on the 2D image sub-segment;
 (v) identifying a working 3D sub-cloud comprised of 3D points from the subset of the 3D point cloud that corresponds to the 2D image sub-segment;
 (vi) fitting a tangent plane to the working 3D sub-cloud;
 (vii) projecting 3D points of the working 3D sub-cloud that are between the first and second key 3D points onto the tangent plane in the normal direction of the tangent plane;
 (viii) defining an axis line parallel to the principle direction of the projected 3D points on the tangent plane;

(xi) projecting 3D points of the working 3D sub-cloud that are between the first and second key 3D points to the axis line;

(x) using the first and second key 3D points to define a length for a most-current 3D geometric primitive shape oriented along the axis line and encompassing at least a portion of the working 3D sub-cloud; and (xi) using the projected 3D points within the working 3D sub-cloud to the axis line to define at least one of a width, height and radius of the most-current 3D geometric primitive shape.

2. The method of claim 1, wherein:

after the step of accessing the 2D image segmentation of the target object, identifying a first end-point and a second end-point of the 2D image segmentation, said first end-point being at an opposite end of the 2D image segmentation as the second end-point;

determining the principle direction of the 2D image segmentation from the first end-point to the second end-point;

the first of said plurality of working regions encompasses the first endpoint, said plurality of working regions are distributed along said 2D segmentation along the determined principle direction of the 2D image segmentation toward the second-end point, and the last of said plurality of working regions encompasses the second-end point; and after step (xi), each additional working region is defined by:

(xii) IF the second end-point is not within the part of the 2D image segmentation that corresponds to the 3D points encompassed by the most-current 3D geometric primitive shape, THEN defining a new working region on said 2D image segmentation along its principle direction toward the second end-point and excluding the part of the 2D image segmentation that corresponds to the 3D points encompassed by the most-current 3D geometric primitive shape, said new region having a first pair of opposing boundaries traversing the 2D image segmentation across its principle direction, said new region being sized to enclose all parts of the 2D image segmentation that lie between its opposing boundaries, and redefining said new region as a working region and proceeding to step (i);

ELSE defining the chain of previously created 3D geometric primitive shapes as the generated 3D geometric primitive representation of the physical target object.

3. The method of claim 2, wherein the two pixels on the 2D image segmentation having the longest geodesic distance between them are identified as said first and second end-points, respectively.

4. The method of claim 1, wherein in step (v), the identified working 3D subcloud is comprised of all the 3D points within the subset of the 3D point cloud that corresponds to the 2D image sub-segment.

5. The method of claim 1, wherein in step (v), the identified working 3D subcloud is comprised of only the 3D points that are between the first and second key 3D points.

6. The method of claim 1, wherein said working region is a geometric shape.

7. The method of claim 1, wherein said working region is a parallelogram.

8. The method of claim 7, wherein said working region is a square.

9. The method of claim 7, wherein the parallelogram is angled parallel to the cable-segment direction of step (ii), and the principle direction is determined from the gradient of the edge pixels in the 2D image sub-segmentation.

10. The method of claim 1, wherein in step (ii), the cable-segment direction is defined as the principle direction of the edge pixels within the 2D image subsegment.

11. The method of claim 1, wherein step (viii) includes determining the principle direction of projected 3D points on the tangent plane.

12. The method of claim 1, wherein in step (viii) the axis line traverses the working 3D sub-cloud.

13. The method of claim 12, wherein axis line is concentric to the working 3D sub-cloud.

14. The method of claim 1, wherein in step (viii), the principle direction of the projected 3D points on the tangent plane defines the axis line.

15. The method of claim 1, wherein in step (ix), the 3D points within the working 3D sub-cloud are projected perpendicularly to the axis line.

16. The method of claim 1, wherein step (x) includes defining first and second boundary lines perpendicular to the axis line and respectively traversing the first and second key 3D points, wherein the distance between the first and second boundary lines defines the length of most-current 3D geometric primitive shape.

17. The method of claim 1, wherein in step (xi), if the most current 3D geometric primitive is a cylinder, then the radius of the cylinder is set not smaller than the longest projection distance among the projected 3D points.

18. The method of claim 1, wherein in step (xi), if the most current 3D geometric primitive is a cuboid with its length determined from the first and second key 3D points, then its height and width are defined to extend to fully encompass all the projected 3D points.

19. The method of claim 1, further comprising after step (xi), step (xii) a new region is selected to be defined if the part of the 2D image segmentation that corresponds to the 3D points encompassed by the most-current 3D geometric primitive shape is not within a predefined geodesic distance from second end-point.

20. The method of claim 2, wherein the new region of step (xii) is of the same shape and size as the most previous working region.

* * * * *